(12) United States Patent
Robert Jose

(10) Patent No.: US 12,174,891 B2
(45) Date of Patent: Dec. 24, 2024

(54) NATURAL LANGUAGE QUERY HANDLING IN MULTI-DOMAIN SYSTEMS

(71) Applicant: Adeia Guides, Inc., San Jose, CA (US)

(72) Inventor: Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 111 days.

(21) Appl. No.: 17/621,641

(22) PCT Filed: Nov. 22, 2019

(86) PCT No.: PCT/US2019/062865
§ 371 (c)(1),
(2) Date: Dec. 21, 2021

(87) PCT Pub. No.: WO2021/076162
PCT Pub. Date: Apr. 22, 2021

(65) Prior Publication Data
US 2022/0358168 A1 Nov. 10, 2022

Related U.S. Application Data

(60) Provisional application No. 62/923,276, filed on Oct. 18, 2019.

(51) Int. Cl.
*G06F 16/906* (2019.01)
*G06F 16/9032* (2019.01)
*G06F 40/295* (2020.01)

(52) U.S. Cl.
CPC ...... *G06F 16/90332* (2019.01); *G06F 16/906* (2019.01); *G06F 40/295* (2020.01)

(58) Field of Classification Search
CPC . G06F 16/90332; G06F 16/906; G60F 40/295
(Continued)

(56) References Cited

U.S. PATENT DOCUMENTS

2010/0082634 A1 4/2010 Leban
2011/0231347 A1 9/2011 Xu et al.
(Continued)

FOREIGN PATENT DOCUMENTS

EP 3144835 A1 3/2017

OTHER PUBLICATIONS

PCT International Search Report for International Application No. PCT/US2019/062864, dated May 7, 2020 (14 pages).
(Continued)

*Primary Examiner* — George C Monikang
(74) *Attorney, Agent, or Firm* — Haley Guiliano LLP

(57) ABSTRACT

Systems and methods for responding to a natural language query are disclosed herein. A query for an entity associated with a plurality of content types is received via a user interface of a computing device. A determination is made as to whether the query specifies any one or more of the plurality of content types. In response to determining that the query specifies one or more of the plurality of content types, a response to the query is generated for visible or audible presentation via the computing device, with the response comprising results from the one or more specified content types. In response to determining that the query lacks specification of any one or more of the plurality of content types, a response to the query is generated for visible or audible presentation via the computing device, with the response comprising results from each of the plurality of content types.

18 Claims, 8 Drawing Sheets

(58) Field of Classification Search
USPC .......................................... 704/231, 251, 9
See application file for complete search history.

(56) References Cited

U.S. PATENT DOCUMENTS

| | | |
|---|---|---|
| 2012/0036137 A1 | 2/2012 | Naidu et al. |
| 2012/0254188 A1 | 10/2012 | Koperski et al. |
| 2015/0382047 A1 | 12/2015 | Van Os et al. |

OTHER PUBLICATIONS

PCT International Search Report for International Application No. PCT/US2019/062865, dated May 6, 2020 (14 pages).
PCT International Search Report for International Application No. PCT/US2019/062866, dated May 20, 2020 (14 pages).

NATURAL LANGUAGE QUERY HANDLING IN MULTI-DOMAIN SYSTEMS

CROSS-REFERENCE TO RELATED APPLICATION

This application is a national stage application under 35 U.S.C. § 371 of International Application PCT/US2019/062865, filed Nov. 22, 2019, which claims the benefit under 35 U.S.C. § 119 (e) of U.S. Provisional Patent Application No. 62/923,276, filed on Oct. 18, 2019. Further, International Applications PCT/US2019/062864, filed Nov. 22, 2019, and PCT/US2019/062866, filed Nov. 22, 2019, are of relevance to this application. The contents of the aforementioned applications are hereby incorporated by reference herein in their respective entireties.

BACKGROUND

The present disclosure relates to natural language processing and, more particularly, to systems and related processes for responding to natural language queries in multi-domain systems.

SUMMARY

The amount of songs, movies, television shows, podcasts, and other types of content available for selection and playback via electronic devices is vast and continues to grow. To help users find items of content among a vast catalog of content for playback, some electronic devices include search interfaces and natural language processing systems. The search interface enables a user to enter a query for content, and the natural language processing system processes the query, searches the catalog of content, and returns search results. For example, a user interested in content of an artist may enter a query for that artist by typing the query within a text box of a graphical user interface, or by speaking the query into a voice-user interface. In some instances, the content catalog may include multiple types of content items for the queried artist. For instance, the artist may produce, be featured in, or be otherwise associated with songs, movies, and television shows. In some cases, the different types of content may be stored and/or provided by different content sources or domains.

When a queried artist has content that spans multiple types or domains, some conventional natural language processing systems respond to a query for the artist by returning content items of one particular type—namely, the type for which the content catalog returns the greatest number of content items—while omitting the artist's content items that fall within other content types. For instance, if an artist is primarily a musician, and has produced many albums of songs, but has also starred in some movies and television shows, a conventional natural language processing system responds to a query for that artist by returning songs by the artist and omitting the movies and television shows that feature the artist, despite the possibility that the user may wish to find the movies and/or television shows of the artist. Other natural language processing systems respond to a query for an artist whose content spans multiple types or domains by returning an equal number of content items for each content type, without regard for whether the artist is more prolific for one type of content than for another.

In view of the foregoing, the present disclosure provides systems and related methods that, by taking into account the different types of content available from particular artists and/or the type(s) of content that may be specified in queries themselves, are able to generate query responses having more relevant and/or more accurate results than possible with prior systems and methods. In one example, the present disclosure provides a system for responding to a natural language query. The system comprises a communication port and control circuitry. The communication port is configured to receive, via a user interface of a computing device, a query for an entity associated with a plurality of content types, the query lacking specification of any one or more of the plurality of content types; selecting, from among the plurality of content types, a primary content type for the entity, based on content types of content items that are associated with the entity and available from a content source; generating a response to the query comprising: a list of identifiers of a plurality of the content items that are associated with the entity and have the primary content type, and a list of one or more identifiers of one or more additional content types, respectively, associated with the entity; and providing the response to the query for visible or audible presentation via the computing device.

In another example, the primary content type is selected as the content type having a highest relative number of content items from among the content items that are associated with the entity and available from the content source.

The one or more identifiers of one or more additional content types, in some aspects, are listed in an order from a content type having a second highest relative number of content items from among the content items that are associated with the entity and available from the content source to a content type having a lowest relative number of content items from among the content items that are associated with the entity and available from the content source.

The control circuitry, in some examples, is further configured to determine, based on the content items that are associated with the entity and available from the content source, that the entity is associated with the plurality of content types.

In another aspect, the control circuitry is further configured to determine, based on one or more terms of the query, that the query lacks specification of any of the plurality of content types.

In a further aspect, the control circuitry is further configured to determine an entity name included in the query and an entity type that corresponds to the entity name by executing a named-entity recognition algorithm based on one or more terms of the query. A query interpretation is generated by replacing the entity name in the query with the corresponding entity type. The control circuitry then determines that the query lacks specification of any of the content types based on the query interpretation and a classification model.

The response to the query, in some aspects, further comprises an identifier of one or more amounts of content items of the one or more additional content types, respectively, and the one or more amounts are based on respective amounts of content items of the one or more additional content types, respectively, that are associated with the entity and available from the content source.

In another example, the response to the query further comprises an identifier of one or more percentages of content items of the one or more additional content types, respectively, and the one or more percentages are based on relative percentages of content items of the one or more additional content types, respectively, that are associated with the entity and available from the content source.

In a further aspect, the content types comprise at least one of audio content, video content, audio-video content, music content, movie content, television content, social media content, streaming content, a content category, or a content genre.

The entity, in some examples, comprises at least one of an artist name or a content genre.

In accordance with another aspect, the present disclosure provides another system for responding to a natural language query. The system comprises a communication port and control circuitry. The communication port is configured to receive, via a user interface of a computing device, a query for an entity. The control circuitry is configured to receive, via a user interface of a computing device, a query for an entity associated with a plurality of content types. The control circuitry determines whether the query specifies any one or more of the plurality of content types. In response to determining that the query specifies one or more of the plurality of content types, the control circuitry is configured to generate, for visible or audible presentation via the computing device, a response to the query comprising results from the one or more specified content types. In response to determining that the query lacks specification of any one or more of the plurality of content types, the control circuitry is configured to generate, for visible or audible presentation via the computing device, a response to the query comprising results from each of the plurality of content types.

In another example, the control circuitry is configured to determine an entity name included in the query and an entity type that corresponds to the entity name by executing a named-entity recognition algorithm based on one or more terms of the query. The control circuitry then generates a query interpretation by replacing the entity name in the query with the corresponding entity type. The determination of whether the query specifies any one or more of the plurality of content types is performed based on the query interpretation and a classification model, and the classification model identifies a content type, if any, to which the query interpretation corresponds.

In a further aspect, the control circuitry is configured to determine whether the query specifies any one or more of the plurality of content types by matching the query interpretation to the content type, if any, indicated by the classification model as corresponding to the query interpretation.

In still another example, the classification model maps query interpretations to corresponding content types, if any, irrespective of the entity name. The control circuitry, in some aspects, is configured to determine, based on content items that are associated with the entity and available from a content source, that the entity is associated with the plurality of content types. The determination of whether the query specifies any one or more of the plurality of content types comprises determining that the query lacks specification of any of the plurality of content types based on one or more terms of the query.

In still a further example, the control circuitry is configured to, in response to determining that the query specifies one or more of the plurality of content types, exclude from the response to the query any results from content types other than the one or more specified content types.

The control circuitry, in some instances, is further configured to generate the response to the query comprising results from each of the plurality of content types by determining proportions of the content types associated with the entity and for which content items are available from a content source; and generating, as the response to the query, a list of a plurality of the content items having content types in accordance with the determined proportions.

In another example, the proportion for each content type is a percentage of a number of the content items that are associated with the entity, are available from the content source, and have the respective content type, as a fraction of a total number of the content items that are associated with the entity and are available from the content source regardless of content type.

In a further aspect, the list orders the plurality of the content items beginning with content items of a content item type having a highest value of the proportions and ending with content items of a content item type having a lowest value of the proportions.

In still another example, the control circuitry is further configured to determine the proportions of content types of content items that are associated with the entity and available from a content source by searching the content source for the content items associated with the entity; determining a total amount of the content items for each content type; determining a total amount of the content items irrespective of content type; and for each content type, computing the proportion as a ratio of the total amount of the content items for the content type to a total amount of the content items irrespective of content type.

In accordance with another aspect, the present disclosure provides another system for responding to a natural language query. The system comprises a communication port and control circuitry. The communication port is configured to receive, via a user interface of a computing device, a query for an entity associated with a plurality of content types, the query including a specification of a content type from among the plurality of content types. The control circuitry is configured to generate a response to the query comprising (i) a list of identifiers of a plurality of the content items that are associated with the entity and have the specified content type and (ii) a list of one or more identifiers of one or more additional content types associated with the entity. The response to the query is then provided for visible or audible presentation via the computing device.

In another example, the control circuitry is further configured to receive a selection of at least one of the identifiers of the one or more additional content types. In response to receiving the selection, the control circuitry generates a list of identifiers of a plurality of the content items that are associated with the entity and have the content type corresponding to the selected identifier.

In a further aspect, the one or more identifiers of one or more additional content types are listed in an order from a content type having a higher relative number of content items from among the content items that are associated with the entity and available from the content source to a content type having a lower relative number of content items from among the content items that are associated with the entity and available from the content source.

In still another example, the control circuitry is further configured to determine, based on the content items that are associated with the entity and available from the content source, that the entity is associated with the plurality of content types.

In still a further example, the control circuitry is further configured to determine, based on one or more terms of the query, that the query includes the specification of the content type.

The control circuitry, in some instances, is further configured to determine an entity name included in the query and an entity type that corresponds to the entity name by executing a named-entity recognition algorithm based on one or more terms of the query. A query interpretation is generated by replacing the entity name in the query with the corresponding entity type. The control circuitry then determines that the query includes a specification of the content type based on the query interpretation and a classification model.

In another example, the response to the query further comprises an identifier of one or more amounts of content items of the one or more additional content types, respectively, and wherein the one or more amounts are based on respective amounts of content items of the one or more additional content types, respectively, that are associated with the entity and available from the content source.

In a further aspect, the response to the query further comprises an identifier of one or more percentages of content items of the one or more additional content types, respectively, and wherein the one or more percentages are based on relative percentages of content items of the one or more additional content types, respectively, that are associated with the entity and available from the content source.

In still another example, the content types comprise at least one of audio content, video content, audio-video content, music content, movie content, television content, social media content, streaming content, a content category, or a content genre.

In still a further example, the entity comprises at least one of an artist name or a content genre.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
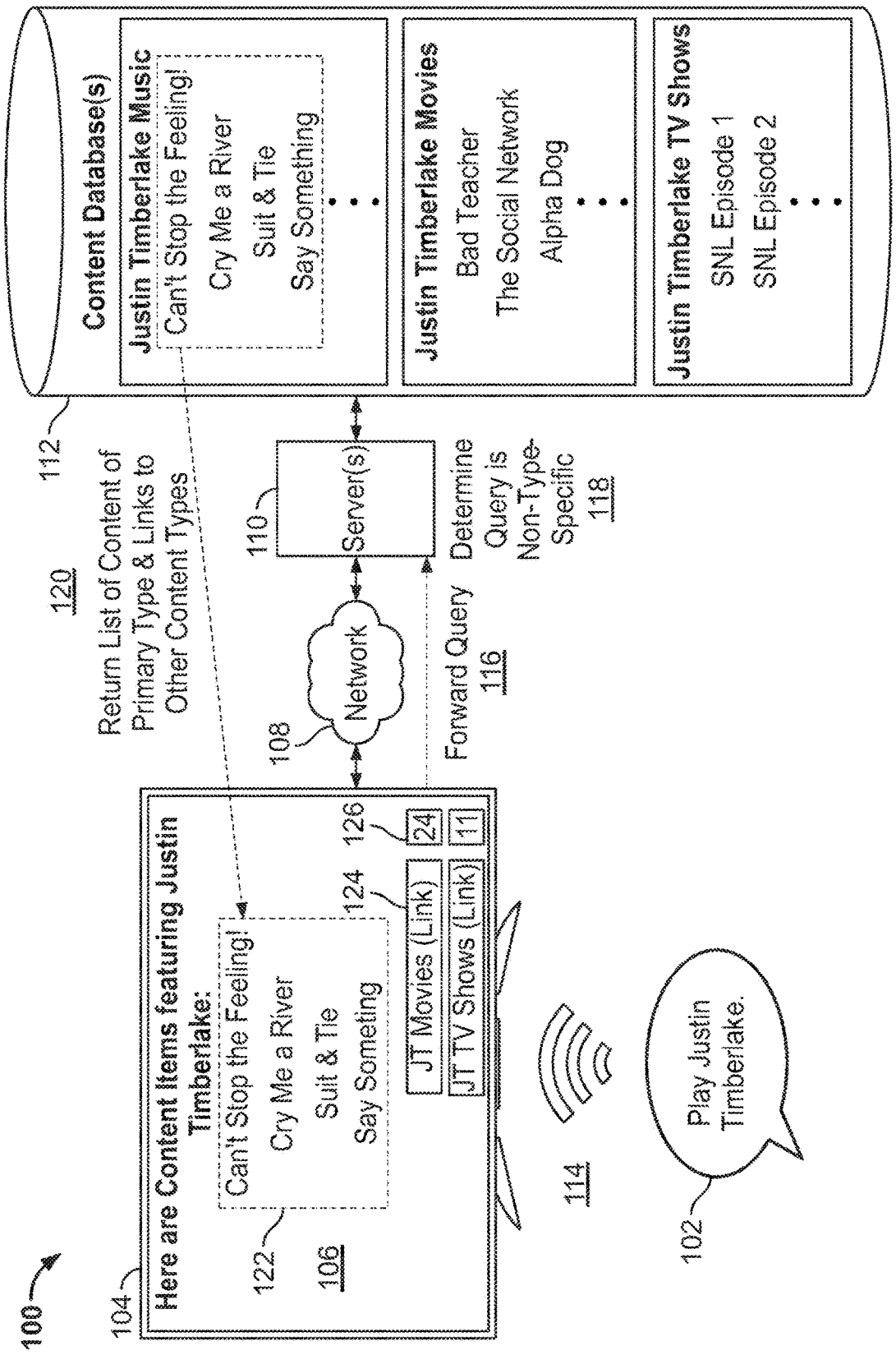
FIG. 1 illustrates an overview of a scenario in which a system handles a natural language query that lacks specification of a content type, in accordance with some embodiments of the disclosure.

FIG. 1 illustrates an overview of a scenario in which a system 100 handles a natural language query 102 that lacks specification of a type of content, in accordance with some embodiments of the disclosure. System 100 includes a device 104, such as a smart phone, a smart television, a smart speaker, or the like, that has various user interfaces configured to interact with one or more nearby users. In some examples, device 104 has a display 106, which is configured to display information via a graphical user interface, and a voice-user interface 107, which is configured to receive natural language query 102 as it is uttered by a nearby user (not shown in FIG. 1). In other embodiments, device 104 has an audio driver, such as a speaker (not shown in FIG. 1), configured to audibly provide information, such as query responses, to one or more users. System 100 also includes network 108, such as the Internet, one or more server(s) 110, and one or more content database(s) 112. Device 104 and server 110 are communicatively coupled to one another by way of network 108, and server 110 is communicatively coupled to content database 112 by way of one or more communication paths, such as a proprietary communication path and/or network 108. Device 104 receives (114) natural language query 102 (in this example, the query "Play Justin Timberlake") by way of voice-user interface 107 and forwards (116) query 102 to server 110 via network 108. Server 110 determines (118), in a manner described in further detail below, that query 102 is a non-content-type-specific query, in other words, that query 102 lacks any direct and/or indirect specification of a content type, such as audio content, video content, audio-video content, music content (e.g., songs), movie content, television show content, social media content (for example, without limitation, social media posts, likes, dislikes, comments, user-generated audio and/or video content uploaded to FACEBOOK, INSTAGRAM, TWITTER, SMULE, and/or any other social media platform), or the like, to which query 102 is directed. Server 110 then accesses content database 112 to search for identifiers of content that matches query 102 and returns (120) content identified as matching query 102 to device 104 for visual and/or aural presentation to the user via display 106 and/or audio interface (not shown in FIG. 1), respectively. The content database may be the database on which the contents are stored. Alternatively, the database is a directory of content available from various sources. In one example, server 110 determines a primary type of content associated with the queried entity and one or more additional (e.g., secondary, tertiary) types of content associated with the entity, for instance based on the relative amounts of content items stored in content database(s) 112 in association with the entity. In particular, the primary type of content may be the type of content having the highest amount of content items stored in database 112 in association with the entity, and the secondary type of content may be the type of content having the second highest amount of content items stored in database 112 in association with the entity, and so forth. In such an example, server 110 returns (120) for visual and/or aural presentation to the user via display 106 and/or audio interface (not shown in FIG. 1) a list 122 of content item identifiers determined to match both the primary type of content associated with the entity (such as music, in this example) and the entity (artist Justin Timberlake, in this example) specified in query 102, as well as one or more links 124 to one or more additional types of content determined to be associated with the specified entity, with each of the links 124 being selectable to cause content item identifiers for the additional types of content (e.g., secondary type of content, tertiary type of content, and so forth) to be displayed in an updated version of the list 122 and/or in a separate list. In some aspects, server 110 may also return (120) for visual and/or aural presentation to the user via display 106 and/or audio interface (not shown in FIG. 1) identifiers 126 of corresponding amounts and/or relative percentages alongside links 124 to secondary content, tertiary, and so forth. In this manner, system 100 may provide a query result that strikes a balance between the various types of content associated with a queried entity, even when the user has provided a non-content-type-specific query to system 100.

Figure 2:
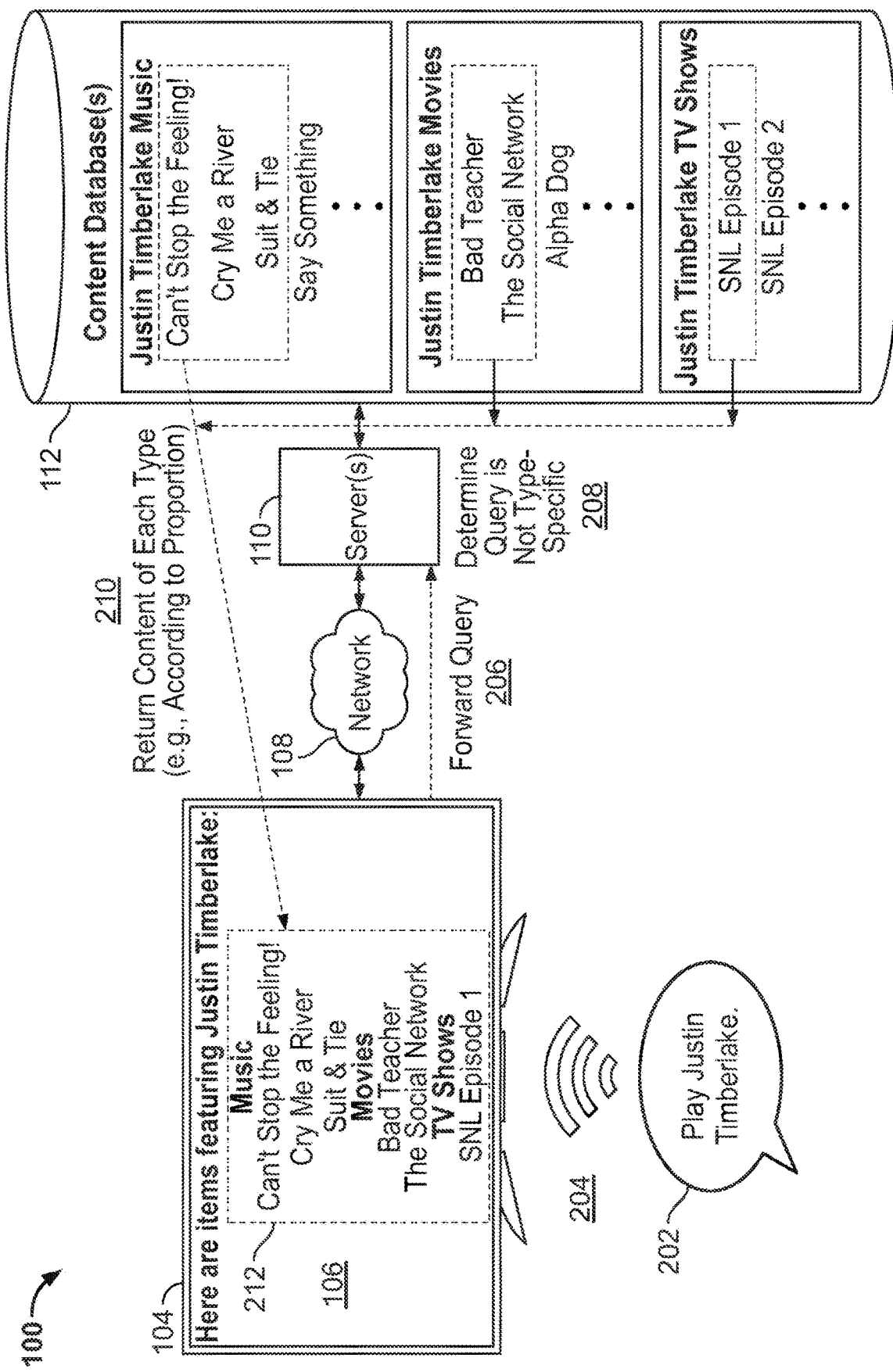
FIG. 2 illustrates an overview of another scenario in which a system handles a natural language query that lacks specification of a content type, in accordance with some embodiments of the disclosure.

FIG. 2 illustrates an overview of a scenario in which the system 100 handles a natural language query 202 that lacks specification of a content type, in accordance with some embodiments of the disclosure. Device 104 receives (204) natural language query 202 (in this example, the query "Play Justin Timberlake") by way of voice-user interface 107 and forwards (206) query 202 to server 110 via network 108. In some aspects, server 110 determines (208), in a manner described in further detail below, that query 202 is a non-content-type-specific query, in other words, that query 202 lacks any direct and/or indirect specification of a content type, such as music, movies, television shows, or the like, to which query 202 is directed. Server 110 then accesses content database 112 to search for content matching query 202 and returns (210), to device 104 for visual and/or aural presentation to the user via display 106 and/or audio interface (not shown in FIG. 1), respectively, a list 212 of identifiers of content identified as matching query 202. In one example, server 110 returns the list 212 of identifiers of a variety of content types (such as music, movies, and television shows), with the variety determined in a manner described below, for the entity (artist Justin Timberlake, in this example) specified in query 202.

Figure 3:
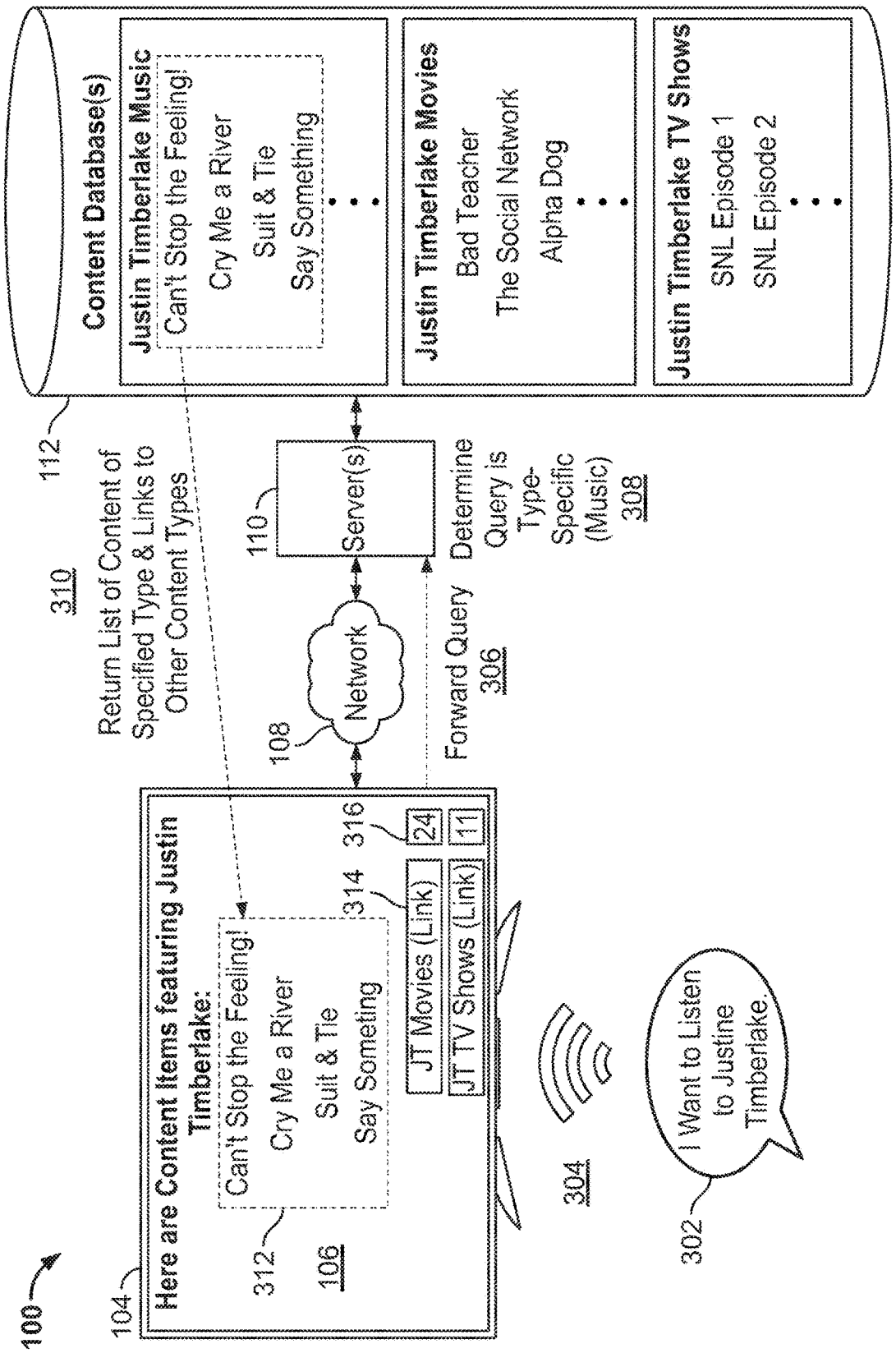
FIG. 3 illustrates an overview of a scenario in which a system handles a natural language query for a specific type of content, in accordance with some embodiments of the disclosure.

FIG. 3 illustrates an overview of a scenario in which system 100 handles a natural language query 302 for a specific type of content, in accordance with some embodiments of the disclosure. Device 104 receives (304) natural language query 302 (in this example, the query "I want to listen to Justin Timberlake") by way of voice-user interface 107 and forwards (306) query 302 to server 110 via network 108. Server 110 determines (308), in a manner described in further detail below, that query 302 is a content-type-specific query, in other words, that query 302 directly and/or indirectly specifies a content type, such as audio content, video content, audio-video content, music content (e.g., songs), movie content, television show content, social media content (for example, without limitation, social media posts, likes, dislikes, comments, user-generated audio and/or video content uploaded to FACEBOOK, INSTAGRAM, TWITTER, SMULE, and/or any other social media platform), or the like, to which query 302 is directed. Server 110 then accesses content database 112 to search for content matching query 302 and returns (310) content identified as matching query 302 to device 104 for visual and/or aural presentation to the user via display 106 and/or audio interface (not shown in FIG. 3), respectively. In one example, server 110 returns (310) for visual and/or aural presentation to the user via display 106 and/or audio interface (not shown in FIG. 3) a list 312 of content item identifiers determined to match both the type of content (music, in this example) and the entity (artist Justin Timberlake, in this example) specified in query 302 as well as one or more links 314 to one or more additional types of content determined to be associated with the specified entity, with each of the links 314 being selectable by the user to cause content item identifiers for the additional types of content to be visibly and/or audibly presented in an updated version of the list 312 and/or in a separate list. In some aspects, server 110 may also return (310) for visual and/or aural presentation to the user via display 106 and/or audio interface (not shown in FIG. 3) indicators 316 of corresponding amounts and/or relative percentages alongside links 314 to secondary content, tertiary, and so forth. In this manner, system 100 may provide a query result that strikes a balance between the various types of content associated with a queried entity, when the user has provided a content-type-specific query to system 100 but the entity is also associated with additional types of content not specified in query 302.

Figure 4:
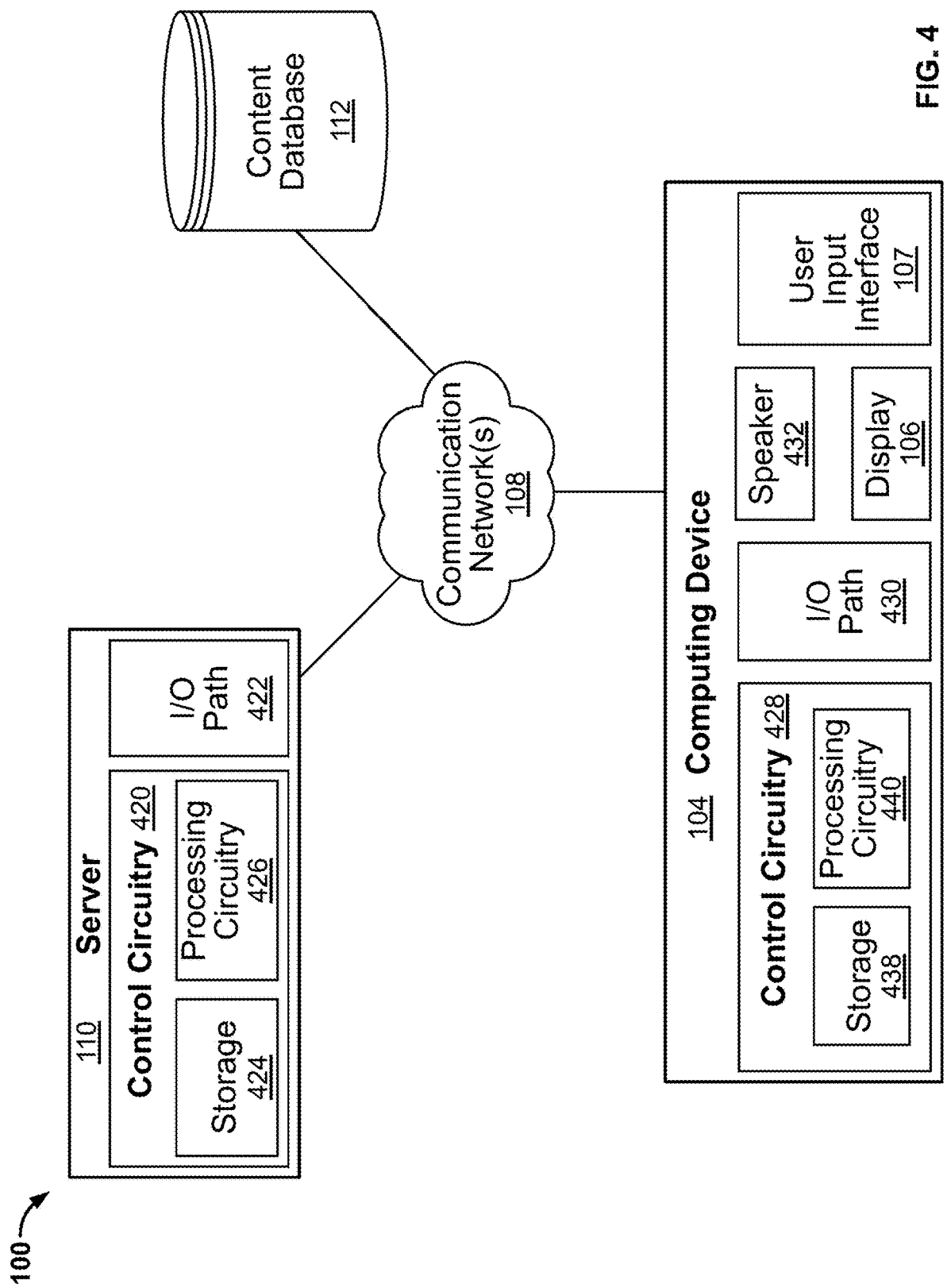
FIG. 4 is an illustrative block diagram showing a system for responding to a natural language query, in accordance with some embodiments of the disclosure.

FIG. 4 is an illustrative block diagram showing additional details of an example of system 100 for responding to a natural language query, in accordance with some embodiments of the disclosure. Although FIG. 4 shows system 100 as including a number and configuration of individual components, in some embodiments, any number of the components of system 100 may be combined and/or integrated as one device. System 100 includes computing device 104, server 110, and content database 112, each of which is communicatively coupled to communication network 108, which may be the Internet or any other suitable network or group of networks. In some embodiments, system 100 excludes server 110, and functionality that would otherwise be implemented by server 110 is instead implemented by other components of system 100, such as computing device 104. In still other embodiments, server 110 works in conjunction with computing device 104 to implement certain functionality described herein in a distributed or cooperative manner.

Server 110 includes control circuitry 420 and input/output (hereinafter "I/O") path 422, and control circuitry 420 includes storage 424 and processing circuitry 426. Computing device 104, which may be a personal computer, a laptop computer, a tablet computer, a smartphone, a smart television, a smart speaker, or any other type of computing device, includes control circuitry 428, I/O path 430, speaker 432, display 106, and user input interface 107, which in some embodiments includes a voice-user interface configured to receive natural language queries uttered by users in proximity to computing device 104. Control circuitry 428 includes storage 438 and processing circuitry 440. Control circuitry 420 and/or 428 may be based on any suitable processing circuitry such as processing circuitry 426 and/or 440. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 424, storage 438, and/or storages of other components of system 100 (e.g., storages of content database 112, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 424, storage 438, and/or storages of other components of system 100 may be used to store various types of content, metadata, and or other types of data. Non-volatile memory may also be used (e.g., to launch a boot-up routine and other instructions). Cloud-based storage may be used to supplement storages 424, 438 or instead of storages 424, 438. In some embodiments, control circuitry 420 and/or 428 executes instructions for an application stored in memory (e.g., storage 424 and/or 438). Specifically, control circuitry 420 and/or 428 may be instructed by the application to perform the functions discussed herein. In some implementations, any action performed by control circuitry 420 and/or 428 may be based on instructions received from the application. For example, the application may be implemented as software or a set of executable instructions that may be stored in storage 424 and/or 438 and executed by control circuitry 420 and/or 428. In some embodiments, the application may be a client/server application where only a client application resides on computing device 104, and a server application resides on server 110.

The application may be implemented using any suitable architecture. For example, it may be a stand-alone application wholly implemented on computing device 104. In such an approach, instructions for the application are stored locally (e.g., in storage 438), and data for use by the application is downloaded on a periodic basis (e.g., from an out-of-band feed, from an Internet resource, or using another suitable approach). Control circuitry 428 may retrieve instructions for the application from storage 438 and process the instructions to perform the functionality described herein. Based on the processed instructions, control circuitry 428 may determine what action to perform when input is received from user input interface 107.

In client/server-based embodiments, control circuitry 428 may include communication circuitry suitable for communicating with an application server (e.g., server 110) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 108). In another example of a client/server-based application, control circuitry 428 runs a web browser that interprets web pages provided by a remote server (e.g., server 110). For example, the remote server may store the instructions for the application in a storage device. The remote server may process the stored instructions using circuitry (e.g., control circuitry 420) and/or generate displays. Computing device 104 may receive the displays generated by the remote server and may display the content of the displays locally via display 106. This way, the processing of the instructions is performed remotely (e.g., by server 110) while the resulting displays, such as the display windows described elsewhere herein, are provided locally on computing device 104. Computing device 104 may receive inputs from the user via input interface 107 and transmit those inputs to the remote server for processing and generating the corresponding displays.

A user may send instructions to control circuitry 420 and/or 428 using user input interface 107. User input interface 107 may be any suitable user interface, such as a remote control, trackball, keypad, keyboard, touchscreen, touchpad, stylus input, joystick, voice recognition interface, gaming controller, or other user input interfaces. User input interface 107 may be integrated with or combined with display 106, which may be a monitor, a television, a liquid crystal display (LCD), an electronic ink display, or any other equipment suitable for displaying visual images.

Server 110 and computing device 104 may transmit and receive content and data via I/O path 422 and 430, respectively. For instance, I/O path 422 and/or I/O path 430 may include a communication port configured to transmit and/or receive (for instance to and/or from content database 112), via communication network 108, content item identifiers, natural language queries, and/or other data. Control circuitry 420, 428 may be used to send and receive commands, requests, and other suitable data using I/O paths 422, 430.

Figure 5:
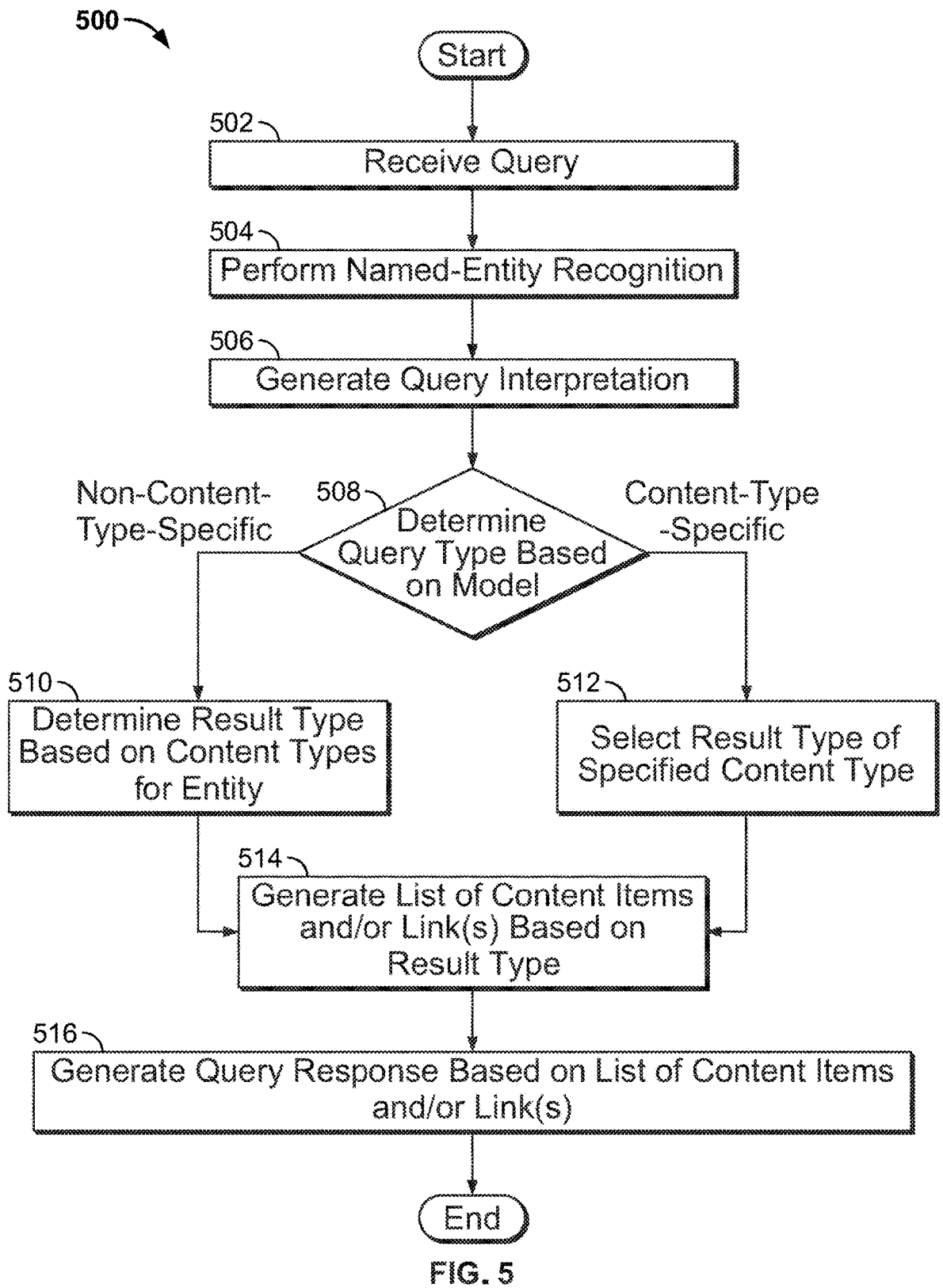
FIG. 5 depicts an illustrative flowchart of a process for responding to a natural language query, in accordance with some embodiments of the disclosure.

Having described system 100, reference is now made to FIG. 5, which depicts an illustrative flowchart of process 500 for responding to a natural language query, which may be implemented by system 100, in accordance with some embodiments of the disclosure. In various embodiments, individual steps of process 500, or any process described herein, may be implemented by one or more components of system 100. Although the present disclosure may describe certain steps of process 500 (and of other processes described herein) as being implemented by certain components of system 100, this is for purposes of illustration only, and other components of system 100 may implement those steps instead. At 502, control circuitry 420 receives a natural language query, such as query 102, query 202, or query 302, described above, by way of voice-user interface 107 and communication network 108.

Figure 6:
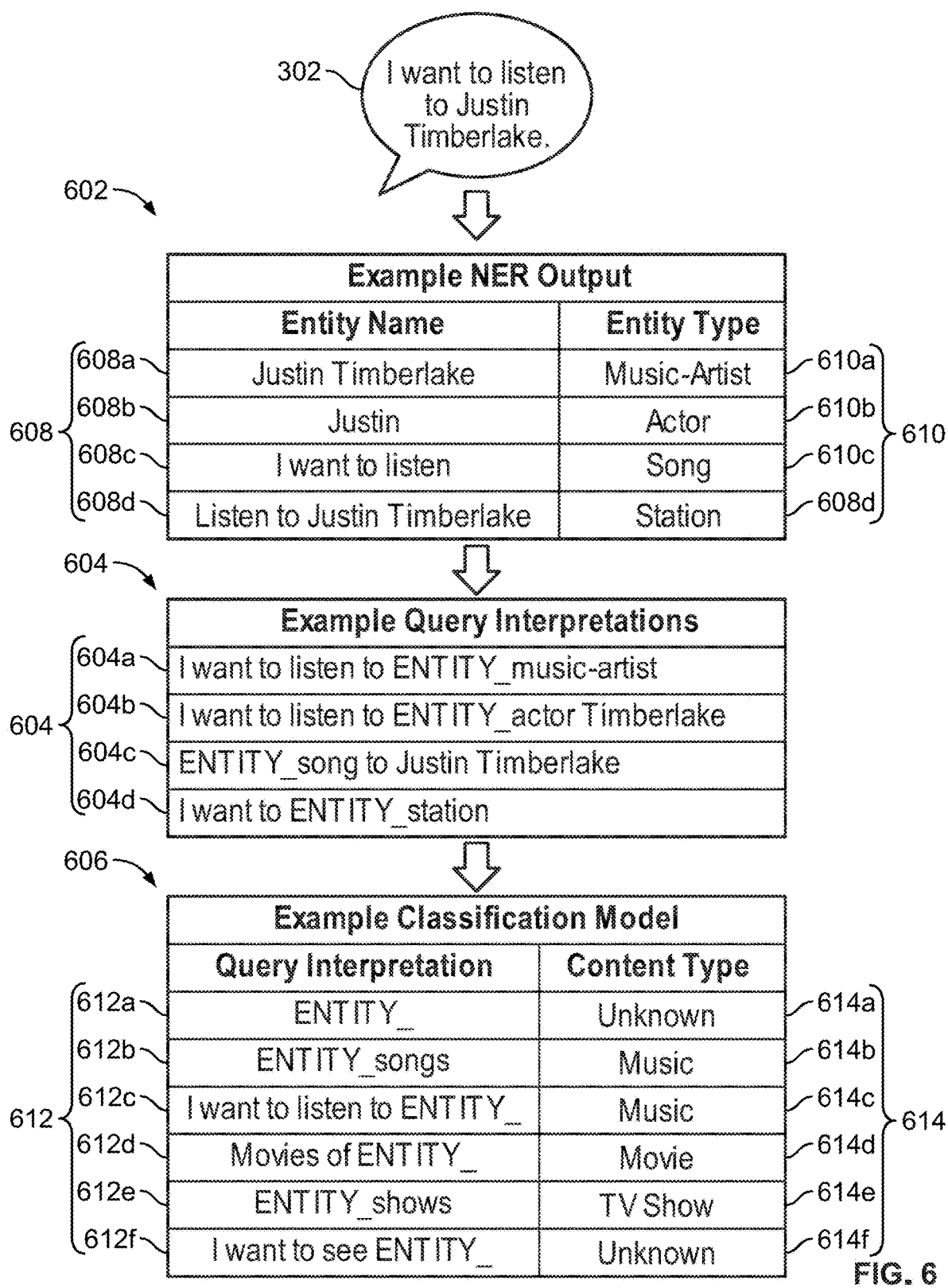
FIG. 6 depicts example data structures of named-entity recognition output, query interpretations, and a classification model, in accordance with some embodiments of the disclosure.

At 504, control circuitry 420 feeds the terms and/or structure of the natural language query that was received at 502 into a named-entity recognition (NER) algorithm, such as NER algorithms provided by General Architecture for Text Engineering (GATE)™, Apache OpenNLP™, SpaCy™, or the like, to generate one or more named-entity recognition outputs. In some examples, the named-entity recognition outputs are generated by extracting names of entities mentioned in the query and/or entity types for those named entities by applying the terms of the query to a knowledge graph and/or using data scores. Thus, one example type of named-entity recognition output includes (1) a list of entity names (or entity identifiers and/or phrases) and (2) an entity type or classifier for the entity name. Specific examples of named-entity recognition outputs 602 that control circuitry 420 may generate at 504 based on a query are shown in FIG. 6. In particular, control circuitry 420 generates pairs of entity names 608a through 608d (collectively, 608) (such as proper names of artists or other persons, terms or phrases that are predetermined to signal a particular type of content, or the like) and entity types 610a through 610d (collectively, 610) (such as a music-artist, actor, or other type of artist; a song or other type of content; a content channel or station; or the like) that correspond to the entity names 608. Using query 302 as an example, in response to receiving query 302 ("I want to listen to Justin Timberlake") and executing a named-entity recognition algorithm upon query 302, control circuitry 420 may generate pairs of entity names 608 and entity types 610 that correspond to the entity names 608, based on terms and/or structure of query 302. For instance, control circuitry 420 may generate at 504 entity name 608a ("Justin Timberlake") and corresponding entity type 610a ("Music-Artist"); entity name 608b ("Justin") and corresponding entity type 610b ("Actor"); entity name 608c ("I want to listen") and corresponding entity type 610c ("Song"); and entity name 608d ("Listen to Justin Timberlake") and corresponding entity type 610d ("Station").

At 506, control circuitry 420 generates a query interpretation based on the named-entity recognition output generated at 504. In some examples, control circuitry 420 generates the query interpretation by rewriting the query with the entity names 608 replaced with the corresponding entity type 610. Specific examples of query interpretations 604 that control circuitry 420 may generate at 506 based on a query are shown in FIG. 6. In particular, control circuitry 420 generates query interpretations 604a through 604d (collectively 604) that correspond to respective ones of entity names 608a through 608d and entity types 610a through 610d. Using query 302 ("I want to listen to Justin Timberlake") as an example, at 506 control circuitry 420 may generate query interpretation 604a ("I want to listen to ENTITY_music-artist") by rewriting query 302 with entity type 610a ("Music-Artist") replacing the corresponding entity name 608a ("Justin Timberlake"). Similarly, control circuitry 420 may generate query interpretation 604b ("I want to listen to ENTITY_actor Timberlake") by rewriting query 302 with entity type 610b ("Actor") replacing the corresponding entity name 608b ("Justin"); control circuitry 420 may generate query interpretation 604c ("ENTITY_song to Justin Timberlake") by rewriting query 302 with entity type 610c ("Song") replacing the corresponding entity name 608c ("I want to listen"); and control circuitry 420 may generate query interpretation 604d ("I want to ENTITY_station") by rewriting query 302 with entity type 610d ("Station") replacing the corresponding entity name 608d ("Listen to Justin Timberlake").

At 508, control circuitry 420 utilizes a classification model together with the query interpretations that were generated at 506 to determine a type of the query received at 502. One example type of query (sometimes referred to as a content-type-specific query) is a query that directly and/or indirectly specifies one or more types of content (such as music, movies, television shows, or the like) to which the query is directed. Another example type of query (sometimes referred to as a non-content-type-specific query) is a query that is ambiguous as to content type or lacks any direct and/or indirect specification of a type of content to which the query is directed.

FIG. 6 includes an example classification model 606 that may be employed at 508 to determine a query type in accordance with some embodiments of the disclosure. Classification model 606 includes query interpretations 612a through 612f (collectively, 612) and content types 614a through 614f (collectively, 614) that correspond to query interpretations 612a through 612f, respectively. In some examples, at 508 control circuitry 420 (1) matches each one of query interpretations 604a through 604f to a corresponding one of query interpretations 612a through 612f and a corresponding one of content types 614a through 614f, and then (2) determines, as the content type for the query received at 502, the one of content type 614a through 614f that is the best match (for instance, by having the highest tally of occurrences) based on query interpretations 604a through 604d. In this example, query interpretations 604a and 604b may be determined to correspond to query interpretations 612c and content type 614c ("Music"), query interpretation 604c may be determined to correspond to query interpretation 612b and content type 614b ("Music"), and control circuitry 420 may determine that query 302 is a content-type-specific query directed to music content. In another example, however, control circuitry 420 may determine that a different query (such as query 102—"Justin Timberlake" or query 202—"Play Justin Timberlake") is non-content-type-specific, ambiguous as to content type, or directed to an unknown content type.

If control circuitry 420 determines at 508 that the query received at 502 is a non-content-type-specific query ("non-content-type-specific" at 508), then control passes to 510, at which control circuitry 420 determines a result type based on relative proportions of content types stored in content database for the entity identified based on the named-entity recognition performed at 504. For instance, if control circuitry 420 identified Justin Timberlake as an entity of the query received at 502, then at 510, control circuitry 420 may determine the relative proportions of types of content items that (1) are stored in content database 112 and (2) Justin Timberlake produced, is featured in, or is otherwise associated with. As one example, control circuitry 420 may determine (for instance by searching one or more content databases 112, by scraping content sources available over network 108, and/or by referring to a table such as table 800 shown in FIG. 8 and described below, which defines content types for artists and may be updated periodically and/or as new content items and/or sources become available) that of all the content that artist Justin Timberlake has produced, is featured in, or is otherwise associated with consists of (e.g., by number of content items) 79% music content, 14% movie content, and 7% television show content. In such an example, control circuitry 420 at 510 determines that the result type for the query received at 502 for Justin Timberlake content should be made up of (e.g., by number of content items) 79% music content, 14% movie content, and 7% television show content, to reflect Justin Timberlake's proportion of content types. Additional details regarding an example process by which control circuitry 420 may determine a result type at 510 are described below in the context of FIG. 6.

If control circuitry 420 determines at 508 that the query received at 502 is a content-type-specific query ("content-type-specific" at 508), then control passes to 512. At 512, control circuitry 420 selects, as the result type to be used for processing the query, the content type (for instance, music, in the example provided above) that was determined at 508.

At 514, control circuitry 420 searches content database 112 for identifiers of content items that match the query, taking into account the type(s) of content selected at 510 or 512 (as the case may be) and generates a list of content items with proportions and ordering based on the result type determined at 510 or selected at 512 (as the case may be). For instance, if control was passed to 514 from 510, then at 514 control circuitry 420 in one aspect (such as described above in connection with FIG. 2) may generate a list of content items stored in content database 112, with the list having a variety of types of content items according to the proportions (79% music content, 14% movie content, and 7% television show content for the Justin Timberlake example provided above) from the result type determined at 510. If, on the other hand, control was passed to 514 from 512, then at 514 control circuitry 420 in another aspect (such as described above in connection with FIG. 3) may generate a list of content items stored in content database 112 having only the single type of content (music, in the example provided above), that was selected at 512 based on being specified in the query received at 502. In such an example, control circuitry 420 may also generate a list of one or more identifiers (e.g., links 314) of one or more additional content types associated with the queried entity.

As yet another example, if control was passed to 514 from 510, then at 514 control circuitry 420 in an aspect (such as described above in connection with FIG. 1) may select a primary content type for the queried entity, from among the various content types having content stored in content database 112 for the entity. The primary content type, for instance, may be selected as the content type having a highest relative number of content items from among the content items that are associated with the entity and available from content database 112. Control circuitry 420 may then generate a response to the query including (i) a list (e.g., list 122) of identifiers of content items that are associated with the entity and have the primary content type and (ii) a list of one or more identifiers (e.g., selectable links 124) of one or more additional content types, respectively, associated with the entity. In some examples, the list of the one or more identifiers (e.g., links 124) of one or more additional content types are listed in an order from a content type having a second highest relative number of content items from among the content items that are associated with the entity and available from the content source to a content type having a lowest relative number of content items from among the content items that are associated with the entity and available from the content source. The query response, in another aspect, may further include an identifier (e.g., identifier(s) 126) of one or more amounts of content items of the one or more additional content types, respectively, and wherein the one or more amounts are based on respective amounts of content items of the one or more additional content types, respectively, that are associated with the entity and available from the content source. At 516, control circuitry 420 generates a query response based on the list of content items that was generated at 514, and provides the query response to device 104 for visual and/or aural presentation to the user via display 106 and/or speaker 432, respectively.

Figure 7:
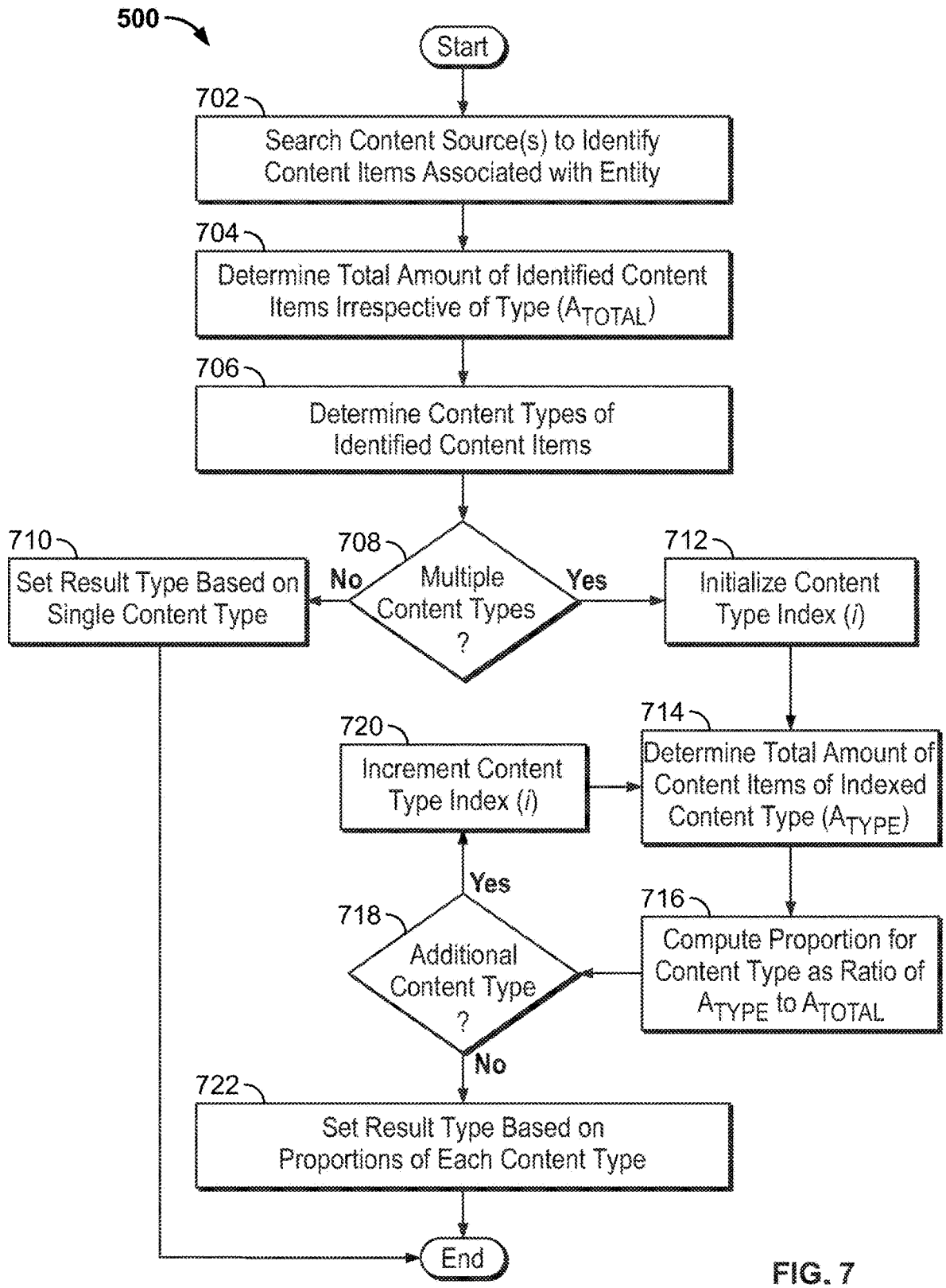
FIG. 7 depicts an illustrative flowchart of a process for determining a result type based on proportions of content types for an entity, in accordance with some embodiments of the disclosure.

FIG. 7 depicts an illustrative flowchart showing additional details of an example process 510 for determining a result type based on proportions of content types for an entity, in accordance with some embodiments of the disclosure. At 702, control circuitry 420 searches content sources (such as content database(s) 112) to identify content items associated with an entity identified by named-entity recognition performed upon a query, such as the query received at 502 (FIG. 5). At 704, control circuitry 420 determines a total amount of identified content items irrespective of the type of those content items ($A_{TOTAL}$). At 706, control circuitry 420 determines content types (such as music content, movie content, television content, podcast content, or any other types of content) of the content items that were identified at 702 as being associated with the entity. At 708, based on the determination at 706, control circuitry 420 determines whether the content items identified at 702 include multiple types of content items or only a single type of content item. If control circuitry 420 determines that the content items identified at 702 do not include multiple types of content items ("No" at 608), then control passes to 710, at which control circuitry 420 sets a result type for that entity/artist based on that single type of content (e.g., music if the only type of content that the artist is associated with is music content). If, on the other hand, control circuitry 420 determines that the content items identified at 702 include multiple types of content items ("Yes" at 708), then control passes to 712.

At 712, control circuitry 420 initializes a content type index (e.g., i) as an index to one of the types of content determined at 706 as being associated with the artist. At 714, control circuitry 420 determines a total amount of content items of the indexed content type ($A_{TYPE}$) that are stored in content database 112 for the entity (e.g., Justin Timberlake) identified in the query received at 502. At 716, control circuitry 420 computes a ratio of the total amount of content items of the indexed content type associated with the artist ($A_{TYPE}$) to the total amount of content items associated with the artist irrespective of the type of those content items ($A_{TOTAL}$). At 718, control circuitry 420 determines whether an additional content type (e.g., music, songs, television shows), from among the types of content types determined at 706 as being associated with the artist, has yet to be analyzed at 714 and thus warrants analysis. If control circuitry 420 determines that an additional content type requires analysis ("Yes" at 718), then control passes to 720 to increment the content type index (i) and repeat the processes of 712 and 714 for the newly indexed content type in a manner similar to that described above for the previously indexed content type. If, on the other hand, control circuitry 420 determines that no additional content type requires analysis ("No" at 718), then control passes to 722. At 722, control circuitry 420 sets a result type for the entity/artist based on the relative proportions of each content type computed at the iterations of 716.

Figure 8:
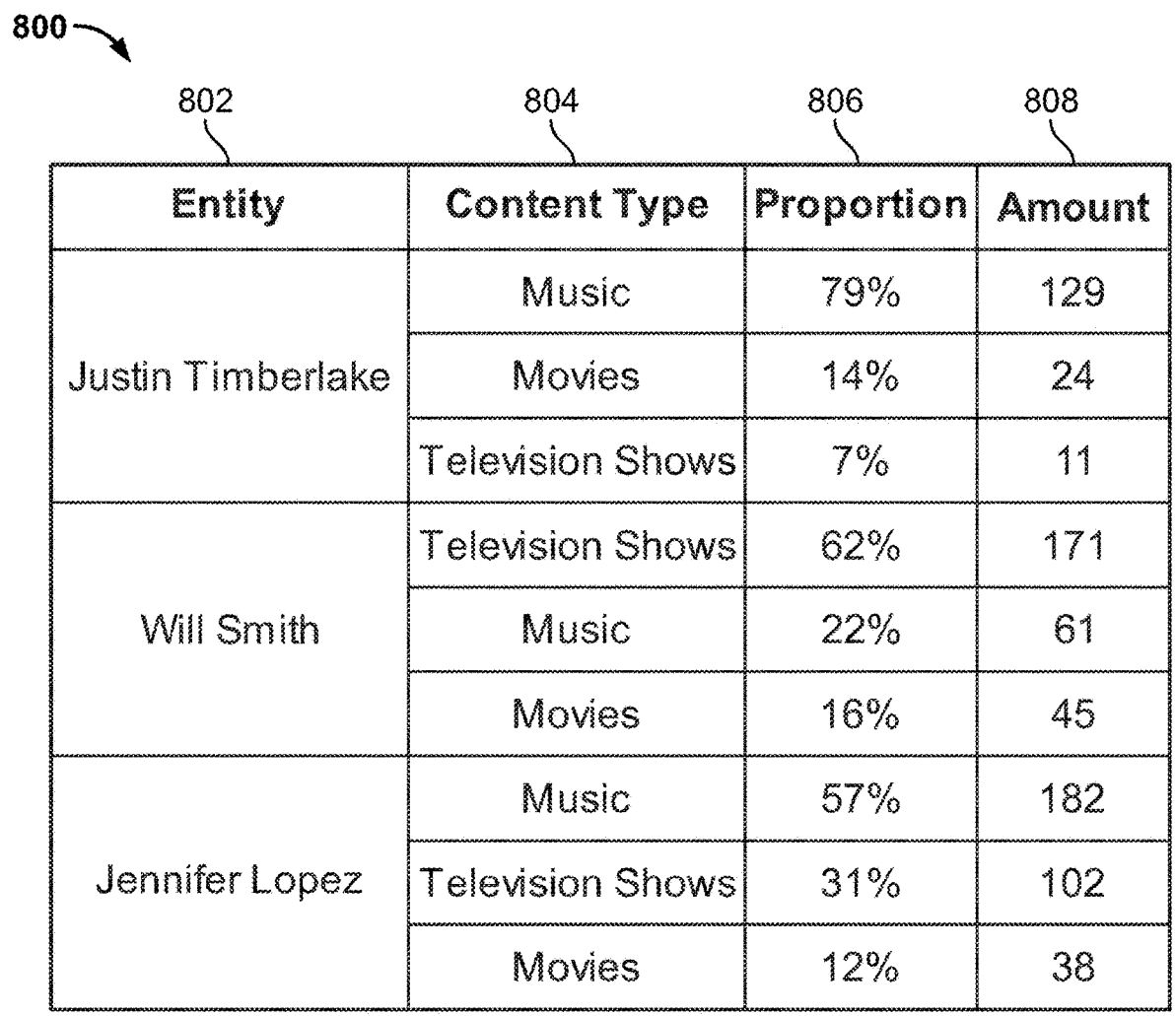
FIG. 8 depicts an example data structure of a result type generated according to the process of FIG. 7, in accordance with some embodiments of the disclosure.

FIG. 8 depicts an example table 800 or data structure of results types that control circuitry 420 may generate according to process 510 of FIG. 5 and FIG. 7, in accordance with some embodiments of the disclosure. Table 800 includes a list of entities 802, content types 804, proportions 806, and amounts 808. Each entry of table 800 defines a result type to be used by control circuitry 420 when handling non-content-type-specific queries received for a particular entity, if that entity is associated with multiple types of content. For instance, table 800 defines a results type of 79% music content, 14% movie content, and 7% television show content for artist Justin Timberlake; it defines a results type of 62% television show content, 22% music content, and 16% movie content for artist Will Smith; and it defines a results type of 57% music content, 31% television show content, and 12% movie content for artist Jennifer Lopez. In some aspects, the respective proportions 806 and/or amounts 808 are presented via display 104 (for instance, as shown in FIG. 1 (126) and/or FIG. 3 (316)) to provide an indication of amounts, or relative percentages, of content items available for a queried entity in the respective content types.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments which include, but are not limited to, the following:

1. A method for responding to a natural language query, the method comprising:
   receiving, via a user interface of a computing device, a query for an entity associated with a plurality of content types, the query lacking specification of any one or more of the plurality of content types;
   selecting, from among the plurality of content types, a primary content type for the entity, based on content types of content items that are associated with the entity and available from a content source;
   generating a response to the query comprising:
      a list of identifiers of a plurality of the content items that are associated with the entity and have the primary content type, and
      a list of one or more identifiers of one or more additional content types, respectively, associated with the entity; and
   providing the response to the query for visible or audible presentation via the computing device.

2. The method of item 1, wherein the primary content type is selected as the content type having a highest relative number of content items from among the content items that are associated with the entity and available from the content source.

3. The method of item 1, wherein the one or more identifiers of one or more additional content types are listed in an order from a content type having a second highest relative number of content items from among the content items that are associated with the entity and available from the content source to a content type having a lowest relative number of content items from among the content items that are associated with the entity and available from the content source.

4. The method of item 1, further comprising:
   determining, based on the content items that are associated with the entity and available from the content source, that the entity is associated with the plurality of content types.

5. The method of item 4, further comprising:
   determining, based on one or more terms of the query, that the query lacks specification of any of the plurality of content types.

6. The method of item 1, further comprising:
   determining an entity name included in the query and an entity type that corresponds to the entity name by executing a named-entity recognition algorithm based on one or more terms of the query;
   generating a query interpretation by replacing the entity name in the query with the corresponding entity type; and
   determining that the query lacks specification of any of the content types based on the query interpretation and a classification model.

7. The method of item 1, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.

8. The method of item 1, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.

9. The method of item 1, wherein the content types comprise at least one of audio content, video content, audio-video content, music content, movie content, television content, social media content, streaming content, a content category, or a content genre.

10. The method of item 1, wherein the entity comprises at least one of an artist name or a content genre.

11. A system for responding to a natural language query, the system comprising:
    a communication port configured to receive, via a user interface of a computing device, a query for an entity associated with a plurality of content types, the query lacking specification of any one or more of the plurality of content types; and
    control circuitry configured to:
    select, from among the plurality of content types, a primary content type for the entity, based on content types of content items that are associated with the entity and available from a content source;
    generate a response to the query comprising:
       a list of identifiers of a plurality of the content items that are associated with the entity and have the primary content type, and
       a list of one or more identifiers of one or more additional content types, respectively, associated with the entity; and provide the response to the query for visible or audible presentation via the computing device.

12. The system of item 11, wherein the primary content type is selected as the content type having a highest relative number of content items from among the content items that are associated with the entity and available from the content source.

13. The system of item 11, wherein the one or more identifiers of one or more additional content types are listed in an order from a content item type having a second highest relative number of content items from among the content items that are associated with the entity and available from the content source to a content type having a lowest relative number of content items from among the content items that are associated with the entity and available from the content source.

14. The system of item 11, wherein the control circuitry is further configured to:
    determine, based on the content items that are associated with the entity and available from the content source, that the entity is associated with the plurality of content types.

15. The system of item 14, wherein the control circuitry is further configured to:
    determine, based on one or more terms of the query, that the query lacks specification of any of the plurality of content types.

16. The system of item 11, wherein the control circuitry is further configured to:
    determine an entity name included in the query and an entity type that corresponds to the entity name by executing a named-entity recognition algorithm based on one or more terms of the query;
    generate a query interpretation by replacing the entity name in the query with the corresponding entity type; and determine that the query lacks specification of any of the content types based on the query interpretation and a classification model.
17. The system of item 11, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
18. The system of item 11, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
19. The system of item 11, wherein the content types comprise at least one of audio content, video content, audio-video content, music content, movie content, television content, social media content, streaming content, a content category, or a content genre.
20. The system of item 11, wherein the entity comprises at least one of an artist name or a content genre.
21. A non-transitory computer-readable medium having instructions encoded thereon that when executed by control circuitry cause the control circuitry to:
receive, via a user interface of a computing device, a query for an entity associated with a plurality of content types, the query lacking specification of any one or more of the plurality of content types;
select, from among the plurality of content types, a primary content type for the entity, based on content types of content items that are associated with the entity and available from a content source;
generate a response to the query comprising:
a list of identifiers of a plurality of the content items that are associated with the entity and have the primary content type, and
a list of one or more identifiers of one or more additional content types, respectively, associated with the entity; and
provide the response to the query for visible or audible presentation via the computing device.
22. The non-transitory computer-readable medium of item 21, wherein the primary content type is selected as the content type having a highest relative number of content items from among the content items that are associated with the entity and available from the content source.
23. The non-transitory computer-readable medium of item 21, wherein the one or more identifiers of one or more additional content types are listed in an order from a content type having a second highest relative number of content items from among the content items that are associated with the entity and available from the content source to a content type having a lowest relative number of content items from among the content items that are associated with the entity and available from the content source.
24. The non-transitory computer-readable medium of item 21, further having instructions encoded thereon that when executed by the control circuitry cause the control circuitry to:
determine, based on the content items that are associated with the entity and available from the content source, that the entity is associated with the plurality of content types.
25. The non-transitory computer-readable medium of item 24, further having instructions encoded thereon that when executed by the control circuitry cause the control circuitry to:
determine, based on one or more terms of the query, that the query lacks specification of any of the plurality of content types.
26. The non-transitory computer-readable medium of item 21, further having instructions encoded thereon that when executed by the control circuitry cause the control circuitry to:
determine an entity name included in the query and an entity type that corresponds to the entity name by executing a named-entity recognition algorithm based on one or more terms of the query;
generate a query interpretation by replacing the entity name in the query with the corresponding entity type; and
determine that the query lacks specification of any of the content types based on the query interpretation and a classification model.
27. The non-transitory computer-readable medium of item 21, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
28. The non-transitory computer-readable medium of item 21, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
29. The non-transitory computer-readable medium of item 21, wherein the content types comprise at least one of audio content, video content, audio-video content, music content, movie content, television content, social media content, streaming content, a content category, or a content genre.
30. The non-transitory computer-readable medium of item 21, wherein the entity comprises at least one of an artist name or a content genre.
31. A system for responding to a natural language query, the system comprising:
means for receiving, via a user interface of a computing device, a query for an entity associated with a plurality of content types, the query lacking specification of any one or more of the plurality of content types;
means for selecting, from among the plurality of content types, a primary content type for the entity, based on content types of content items that are associated with the entity and available from a content source;
means for generating a response to the query comprising:

a list of identifiers of a plurality of the content items that are associated with the entity and have the primary content type, and a list of one or more identifiers of one or more additional content types, respectively, associated with the entity; and means for providing the response to the query for visible or audible presentation via the computing device.

32. The system of item 31, wherein the primary content type is selected as the content type having a highest relative number of content items from among the content items that are associated with the entity and available from the content source.

33. The system of item 31, wherein the one or more identifiers of one or more additional content types are listed in an order from a content type having a second highest relative number of content items from among the content items that are associated with the entity and available from the content source to a content type having a lowest relative number of content items from among the content items that are associated with the entity and available from the content source.

34. The system of item 31, further comprising:
means for determining, based on the content items that are associated with the entity and available from the content source, that the entity is associated with the plurality of content types.

35. The system of item 34, further comprising:
means for determining, based on one or more terms of the query, that the query lacks specification of any of the plurality of content types.

36. The system of item 31, further comprising:
means for determining an entity name included in the query and an entity type that corresponds to the entity name by executing a named-entity recognition algorithm based on one or more terms of the query;
means for generating a query interpretation by replacing the entity name in the query with the corresponding entity type; and
means for determining that the query lacks specification of any of the content types based on the query interpretation and a classification model.

37. The system of item 31, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.

38. The system of item 31, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source 39. The system of item 31, wherein the content types comprise at least one of audio content, video content, audio-video content, music content, movie content, television content, social media content, streaming content, a content category, or a content genre.

40. The system of item 31, wherein the entity comprises at least one of an artist name or a content genre.

41. A method for responding to a natural language query, the method comprising:
receiving, via a user interface of a computing device, a query for an entity associated with a plurality of content types, the query lacking specification of any one or more of the plurality of content types;
selecting, from among the plurality of content types, a primary content type for the entity, based on content types of content items that are associated with the entity and available from a content source;
generating a response to the query comprising:
a list of identifiers of a plurality of the content items that are associated with the entity and have the primary content type, and
a list of one or more identifiers of one or more additional content types, respectively, associated with the entity; and
providing the response to the query for visible or audible presentation via the computing device.

42. The method of item 41, wherein the primary content type is selected as the content type having a highest relative number of content items from among the content items that are associated with the entity and available from the content source.

43. The method of item 41 or 42, wherein the one or more identifiers of one or more additional content types are listed in an order from a content type having a second highest relative number of content items from among the content items that are associated with the entity and available from the content source to a content type having a lowest relative number of content items from among the content items that are associated with the entity and available from the content source.

44. The method of any one of items 41 to 43, further comprising:
determining, based on the content items that are associated with the entity and available from the content source, that the entity is associated with the plurality of content types.

45. The method of item 44, further comprising:
determining, based on one or more terms of the query, that the query lacks specification of any of the plurality of content types.

46. The method of any one of items 41 to 45, further comprising:
determining an entity name included in the query and an entity type that corresponds to the entity name by executing a named-entity recognition algorithm based on one or more terms of the query;
generating a query interpretation by replacing the entity name in the query with the corresponding entity type; and
determining that the query lacks specification of any of the content types based on the query interpretation and a classification model.

47. The method of any one of items 41 to 46, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.

48. The method of any one of items 41 to 47, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source 49. The method of items 41 to 48, wherein the content types comprise at least one of audio content, video content, audio-video content, music content, movie content, television content, social media content, streaming content, a content category, or a content genre.

50. The method of any one of items 41 to 49, wherein the entity comprises at least one of an artist name or a content genre.

51. A method for responding to a natural language query, the method comprising:
receiving, via a user interface of a computing device, a query for an entity associated with a plurality of content types;
determining whether the query specifies any one or more of the plurality of content types;
in response to determining that the query specifies one or more of the plurality of content types, generating, for visible or audible presentation via the computing device, a response to the query comprising results from the one or more specified content types; and
in response to determining that the query lacks specification of any one or more of the plurality of content types, generating, for visible or audible presentation via the computing device, a response to the query comprising results from each of the plurality of content types.

52. The method of item 51, further comprising:
determining an entity name included in the query and an entity type that corresponds to the entity name by executing a named-entity recognition algorithm based on one or more terms of the query; and
generating a query interpretation by replacing the entity name in the query with the corresponding entity type,
wherein determining whether the query specifies any one or more of the plurality of content types is performed based on the query interpretation and a classification model, wherein the classification model identifies a content type, if any, to which the query interpretation corresponds.

53. The method of item 52, wherein determining whether the query specifies any one or more of the plurality of content types comprises matching the query interpretation to the content type, if any, indicated by the classification model as corresponding to the query interpretation.

54. The method of item 52, wherein the classification model maps query interpretations to corresponding content types, if any, irrespective of the entity name.

55. The method of item 51, further comprising:
determining, based on content items that are associated with the entity and available from a content source, that the entity is associated with the plurality of content types,
wherein determining whether the query specifies any one or more of the plurality of content types comprises determining that the query lacks specification of any of the plurality of content types based on one or more terms of the query.

56. The method of item 51, further comprising, in response to determining that the query specifies one or more of the plurality of content types, excluding from the response to the query any results from content types other than the one or more specified content types.

57. The method of item 51, wherein generating the response to the query comprising results from each of the plurality of content types comprises:
determining proportions of the content types associated with the entity and for which content items are available from a content source; and
generating, as the response to the query, a list of a plurality of the content items having content types in accordance with the determined proportions.

58. The method of item 57, wherein the proportion for each content type is a percentage of a number of the content items that are associated with the entity, are available from the content source, and have the respective content type, as a fraction of a total number of the content items that are associated with the entity and are available from the content source regardless of content type.

59. The method of item 57, wherein the list orders the plurality of the content items beginning with content items of a content item type having a highest value of the proportions and ending with content items of a content item type having a lowest value of the proportions.

60. The method of item 57, wherein determining the proportions of content types of content items that are associated with the entity and available from a content source comprises:
searching the content source for the content items associated with the entity;
determining a total amount of the content items for each content type;
determining a total amount of the content items irrespective of content type; and
for each content type, computing the proportion as a ratio of the total amount of the content items for the content type to a total amount of the content items irrespective of content type.

61. A system for responding to a natural language query, the system comprising:
a communication port configured to receive, via a user interface of a computing device, a query for an entity; and
control circuitry configured to:
receive, via a user interface of a computing device, a query for an entity associated with a plurality of content types;
determine whether the query specifies any one or more of the plurality of content types;
in response to determining that the query specifies one or more of the plurality of content types, generate, for visible or audible presentation via the computing device, a response to the query comprising results from the one or more specified content types; and
in response to determining that the query lacks specification of any one or more of the plurality of content types, generate, for visible or audible presentation via the computing device, a response to the query comprising results from each of the plurality of content types.

62. The system of item 61, wherein the control circuitry is further configured to:

determine an entity name included in the query and an entity type that corresponds to the entity name by executing a named-entity recognition algorithm based on one or more terms of the query; and generate a query interpretation by replacing the entity name in the query with the corresponding entity type, wherein determining whether the query specifies any one or more of the plurality of content types is performed based on the query interpretation and a classification model, wherein the classification model identifies a content type, if any, to which the query interpretation corresponds.

63. The system of item 62, wherein the control circuitry is further configured to determine whether the query specifies any one or more of the plurality of content types by matching the query interpretation to the content type, if any, indicated by the classification model as corresponding to the query interpretation.

64. The system of item 62, wherein the classification model maps query interpretations to corresponding content types, if any, irrespective of the entity name.

65. The system of item 61, wherein the control circuitry is further configured to:
determine, based on content items that are associated with the entity and available from a content source, that the entity is associated with the plurality of content types,
wherein determining whether the query specifies any one or more of the plurality of content types comprises determining that the query lacks specification of any of the plurality of content types based on one or more terms of the query.

66. The system of item 61, wherein the control circuitry is further configured to, in response to determining that the query specifies one or more of the plurality of content types, exclude from the response to the query any results from content types other than the one or more specified content types.

67. The system of item 61, wherein the control circuitry is further configured to generate the response to the query comprising results from each of the plurality of content types by:
determining proportions of the content types associated with the entity and for which content items are available from a content source; and
generating, as the response to the query, a list of a plurality of the content items having content types in accordance with the determined proportions.

68. The system of item 67, wherein the proportion for each content type is a percentage of a number of the content items that are associated with the entity, are available from the content source, and have the respective content type, as a fraction of a total number of the content items that are associated with the entity and are available from the content source regardless of content type.

69. The system of item 67, wherein the list orders the plurality of the content items beginning with content items of a content item type having a highest value of the proportions and ending with content items of a content item type having a lowest value of the proportions.

70. The system of item 67, wherein the control circuitry is further configured to determine the proportions of content types of content items that are associated with the entity and available from a content source by:

searching the content source for the content items associated with the entity;
determining a total amount of the content items for each content type;
determining a total amount of the content items irrespective of content type; and
for each content type, computing the proportion as a ratio of the total amount of the content items for the content type to a total amount of the content items irrespective of content type.

71. A non-transitory computer-readable medium having instructions encoded thereon that when executed by control circuitry cause the control circuitry to:
receive, via a user interface of a computing device, a query for an entity associated with a plurality of content types;
determine whether the query specifies any one or more of the plurality of content types;
in response to determining that the query specifies one or more of the plurality of content types, generate, for visible or audible presentation via the computing device, a response to the query comprising results from the one or more specified content types; and
in response to determining that the query lacks specification of any one or more of the plurality of content types, generate, for visible or audible presentation via the computing device, a response to the query comprising results from each of the plurality of content types.

72. The non-transitory computer-readable medium of item 71, further having instructions encoded thereon that when executed by control circuitry cause the control circuitry to:
determine an entity name included in the query and an entity type that corresponds to the entity name by executing a named-entity recognition algorithm based on one or more terms of the query; and
generate a query interpretation by replacing the entity name in the query with the corresponding entity type,
wherein determining whether the query specifies any one or more of the plurality of content types is performed based on the query interpretation and a classification model, wherein the classification model identifies a content type, if any, to which the query interpretation corresponds.

73. The non-transitory computer-readable medium of item 72, wherein determining whether the query specifies any one or more of the plurality of content types comprises matching the query interpretation to the content type, if any, indicated by the classification model as corresponding to the query interpretation.

74. The non-transitory computer-readable medium of item 72, wherein the classification model maps query interpretations to corresponding content types, if any, irrespective of the entity name.

75. The non-transitory computer-readable medium of item 71, further having instructions encoded thereon that when executed by control circuitry cause the control circuitry to:
determine, based on content items that are associated with the entity and available from a content source, that the entity is associated with the plurality of content types,
wherein determining whether the query specifies any one or more of the plurality of content types comprises determining that the query lacks specification of any of the plurality of content types based on one or more terms of the query.

76. The non-transitory computer-readable medium of item 71, further having instructions encoded thereon that when executed by control circuitry cause the control circuitry to, in response to determining that the query specifies one or more of the plurality of content types, exclude from the response to the query any results from content types other than the one or more specified content types.

77. The non-transitory computer-readable medium of item 71, further having instructions encoded thereon that when executed by control circuitry cause the control circuitry to generate the response to the query comprising results from each of the plurality of content types by:
   determining proportions of the content types associated with the entity and for which content items are available from a content source; and
   generating, as the response to the query, a list of a plurality of the content items having content types in accordance with the determined proportions.

78. The non-transitory computer-readable medium of item 77, wherein the proportion for each content type is a percentage of a number of the content items that are associated with the entity, are available from the content source, and have the respective content type, as a fraction of a total number of the content items that are associated with the entity and are available from the content source regardless of content type.

79. The non-transitory computer-readable medium of item 77, wherein the list orders the plurality of the content items beginning with content items of a content item type having a highest value of the proportions and ending with content items of a content item type having a lowest value of the proportions.

80. The non-transitory computer-readable medium of item 77, further having instructions encoded thereon that when executed by control circuitry cause the control circuitry to determine the proportions of content types of content items that are associated with the entity and available from a content source by:
   searching the content source for the content items associated with the entity;
   determining a total amount of the content items for each content type;
   determining a total amount of the content items irrespective of content type; and
   for each content type, computing the proportion as a ratio of the total amount of the content items for the content type to a total amount of the content items irrespective of content type.

81. A system for responding to a natural language query, the system comprising:
   means for receiving, via a user interface of a computing device, a query for an entity associated with a plurality of content types;
   means for determining whether the query specifies any one or more of the plurality of content types;
   means for, in response to determining that the query specifies one or more of the plurality of content types, generating, for visible or audible presentation via the computing device, a response to the query comprising results from the one or more specified content types; and
   means for, in response to determining that the query lacks specification of any one or more of the plurality of content types, generating, for visible or audible presentation via the computing device, a response to the query comprising results from each of the plurality of content types.

82. The system of item 81, further comprising:
   means for determining an entity name included in the query and an entity type that corresponds to the entity name by executing a named-entity recognition algorithm based on one or more terms of the query; and
   means for generating a query interpretation by replacing the entity name in the query with the corresponding entity type,
   wherein the means for determining whether the query specifies any one or more of the plurality of content types is configured to perform the determining based on the query interpretation and a classification model, wherein the classification model identifies a content type, if any, to which the query interpretation corresponds.

83. The system of item 82, wherein the means for determining whether the query specifies any one or more of the plurality of content types comprises means for matching the query interpretation to the content type, if any, indicated by the classification model as corresponding to the query interpretation.

84. The system of item 82, wherein the classification model maps query interpretations to corresponding content types, if any, irrespective of the entity name.

85. The system of item 81, further comprising:
   means for determining, based on content items that are associated with the entity and available from a content source, that the entity is associated with the plurality of content types,
   wherein the means for determining whether the query specifies any one or more of the plurality of content types comprises means for determining that the query lacks specification of any of the plurality of content types based on one or more terms of the query.

86. The system of item 81, further comprising means for, in response to determining that the query specifies one or more of the plurality of content types, excluding from the response to the query any results from content types other than the one or more specified content types.

87. The system of item 81, wherein the means for generating the response to the query comprising results from each of the plurality of content types comprises:
   means for determining proportions of the content types associated with the entity and for which content items are available from a content source; and
   means for generating, as the response to the query, a list of a plurality of the content items having content types in accordance with the determined proportions.

88. The system of item 87, wherein the proportion for each content type is a percentage of a number of the content items that are associated with the entity, are available from the content source, and have the respective content type, as a fraction of a total number of the content items that are associated with the entity and are available from the content source regardless of content type.

89. The system of item 87, wherein the list orders the plurality of the content items beginning with content items of a content item type having a highest value of the proportions and ending with content items of a content item type having a lowest value of the proportions.

90. The system of item 87, wherein the means for determining the proportions of content types of content items that are associated with the entity and available from a content source comprises:
means for searching the content source for the content items associated with the entity;
means for determining a total amount of the content items for each content type;
means for determining a total amount of the content items irrespective of content type; and
means for computing, for each content type, the proportion as a ratio of the total amount of the content items for the content type to a total amount of the content items irrespective of content type.

91. A method for responding to a natural language query, the method comprising:
receiving, via a user interface of a computing device, a query for an entity associated with a plurality of content types;
determining whether the query specifies any one or more of the plurality of content types;
in response to determining that the query specifies one or more of the plurality of content types, generating, for visible or audible presentation via the computing device, a response to the query comprising results from the one or more specified content types; and
in response to determining that the query lacks specification of any one or more of the plurality of content types, generating, for visible or audible presentation via the computing device, a response to the query comprising results from each of the plurality of content types.

92. The method of item 91, further comprising:
determining an entity name included in the query and an entity type that corresponds to the entity name by executing a named-entity recognition algorithm based on one or more terms of the query; and
generating a query interpretation by replacing the entity name in the query with the corresponding entity type,
wherein determining whether the query specifies any one or more of the plurality of content types is performed based on the query interpretation and a classification model, wherein the classification model identifies a content type, if any, to which the query interpretation corresponds.

93. The method of item 92, wherein determining whether the query specifies any one or more of the plurality of content types comprises matching the query interpretation to the content type, if any, indicated by the classification model as corresponding to the query interpretation.

94. The method of item 92 or item 93, wherein the classification model maps query interpretations to corresponding content types, if any, irrespective of the entity name.

95. The method of any one of items 91 to 94, further comprising:
determining, based on content items that are associated with the entity and available from a content source, that the entity is associated with the plurality of content types,
wherein determining whether the query specifies any one or more of the plurality of content types comprises determining that the query lacks specification of any of the plurality of content types based on one or more terms of the query.

96. The method of any one of items 91 to 95, further comprising, in response to determining that the query specifies one or more of the plurality of content types, excluding from the response to the query any results from content types other than the one or more specified content types.

97. The method of any one of items 91 to 96, wherein generating the response to the query comprising results from each of the plurality of content types comprises:
determining proportions of the content types associated with the entity and for which content items are available from a content source; and
generating, as the response to the query, a list of a plurality of the content items having content types in accordance with the determined proportions.

98. The method of item 97, wherein the proportion for each content type is a percentage of a number of the content items that are associated with the entity, are available from the content source, and have the respective content type, as a fraction of a total number of the content items that are associated with the entity and are available from the content source regardless of content type.

99. The method of item 97 or item 98, wherein the list orders the plurality of the content items beginning with content items of a content item type having a highest value of the proportions and ending with content items of a content item type having a lowest value of the proportions.

100. The method of any one of items 97 to 99, wherein determining the proportions of content types of content items that are associated with the entity and available from a content source comprises:
searching the content source for the content items associated with the entity;
determining a total amount of the content items for each content type;
determining a total amount of the content items irrespective of content type; and
for each content type, computing the proportion as a ratio of the total amount of the content items for the content type to a total amount of the content items irrespective of content type.

101. A method for responding to a natural language query, the method comprising:
receiving, via a user interface of a computing device, a query for an entity associated with a plurality of content types, the query including a specification of a content type from among the plurality of content types;
generating a response to the query comprising:
a list of identifiers of a plurality of the content items that are associated with the entity and have the specified content type, and
a list of one or more identifiers of one or more additional content types associated with the entity; and
providing the response to the query for visible or audible presentation via the computing device.

102. The method of item 101, further comprising receiving a selection of at least one of the identifiers of the one or more additional content types and, in response to receiving the selection, generating a list of identifiers of a plurality of the content items that are associated with the entity and have the content type corresponding to the selected identifier.
103. The method of item 101, wherein the one or more identifiers of one or more additional content types are listed in an order from a content type having a higher relative number of content items from among the content items that are associated with the entity and available from the content source to a content type having a lower relative number of content items from among the content items that are associated with the entity and available from the content source.
104. The method of item 101, further comprising:
determining, based on the content items that are associated with the entity and available from the content source, that the entity is associated with the plurality of content types.
105. The method of item 104, further comprising:
determining, based on one or more terms of the query, that the query includes the specification of the content type.
106. The method of item 101, further comprising:
determining an entity name included in the query and an entity type that corresponds to the entity name by executing a named-entity recognition algorithm based on one or more terms of the query;
generating a query interpretation by replacing the entity name in the query with the corresponding entity type; and
determining that the query includes a specification of the content type based on the query interpretation and a classification model.
107. The method of item 101, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
108. The method of item 101, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
109. The method of item 101, wherein the content types comprise at least one of audio content, video content, audio-video content, music content, movie content, television content, social media content, streaming content, a content category, or a content genre.
110. The method of item 101, wherein the entity comprises at least one of an artist name or a content genre.
111. A system for responding to a natural language query, the system comprising:
a communication port configured to receive, via a user interface of a computing device, a query for an entity associated with a plurality of content types, the query including a specification of a content type from among the plurality of content types; and
control circuitry configured to:
generate a response to the query comprising:
a list of identifiers of a plurality of the content items that are associated with the entity and have the specified content type, and
a list of one or more identifiers of one or more additional content types associated with the entity; and
provide the response to the query for visible or audible presentation via the computing device.
112. The system of item 111, wherein the control circuitry is further configured to:
receive a selection of at least one of the identifiers of the one or more additional content types; and
in response to receiving the selection, generating a list of identifiers of a plurality of the content items that are associated with the entity and have the content type corresponding to the selected identifier.
113. The system of item 111, wherein the one or more identifiers of one or more additional content types are listed in an order from a content type having a higher relative number of content items from among the content items that are associated with the entity and available from the content source to a content type having a lower relative number of content items from among the content items that are associated with the entity and available from the content source.
114. The system of item 111, wherein the control circuitry is further configured to:
determine, based on the content items that are associated with the entity and available from the content source, that the entity is associated with the plurality of content types.
115. The system of item 114, wherein the control circuitry is further configured to:
determine, based on one or more terms of the query, that the query includes the specification of the content type.
116. The system of item 111, wherein the control circuitry is further configured to:
determine an entity name included in the query and an entity type that corresponds to the entity name by executing a named-entity recognition algorithm based on one or more terms of the query;
generate a query interpretation by replacing the entity name in the query with the corresponding entity type; and
determine that the query includes a specification of the content type based on the query interpretation and a classification model.
117. The system of item 111, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
118. The system of item 111, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
119. The system of item 111, wherein the content types comprise at least one of audio content, video content, audio-video content, music content, movie content, television content, social media content, streaming content, a content category, or a content genre.
120. The system of item 111, wherein the entity comprises at least one of an artist name or a content genre.

121. A non-transitory computer-readable medium having instructions encoded thereon that when executed by control circuitry cause the control circuitry to:
receive, via a user interface of a computing device, a query for an entity associated with a plurality of content types, the query including a specification of a content type from among the plurality of content types;
generate a response to the query comprising:
a list of identifiers of a plurality of the content items that are associated with the entity and have the specified content type, and
a list of one or more identifiers of one or more additional content types associated with the entity; and
provide the response to the query for visible or audible presentation via the computing device.

122. The non-transitory computer-readable medium of item 121, further having instructions encoded thereon that when executed by the control circuitry cause the control circuitry to:
receive a selection of at least one of the identifiers of the one or more additional content types; and
in response to receiving the selection, generate a list of identifiers of a plurality of the content items that are associated with the entity and have the content type corresponding to the selected identifier.

123. The non-transitory computer-readable medium of item 121, wherein the one or more identifiers of one or more additional content types are listed in an order from a content type having a higher relative number of content items from among the content items that are associated with the entity and available from the content source to a content type having a lower relative number of content items from among the content items that are associated with the entity and available from the content source.

124. The non-transitory computer-readable medium of item 121, further having instructions encoded thereon that when executed by the control circuitry cause the control circuitry to:
determine, based on the content items that are associated with the entity and available from the content source, that the entity is associated with the plurality of content types.

125. The non-transitory computer-readable medium of item 124, further having instructions encoded thereon that when executed by the control circuitry cause the control circuitry to:
determine, based on one or more terms of the query, that the query includes the specification of the content type.

126. The non-transitory computer-readable medium of item 121, further having instructions encoded thereon that when executed by the control circuitry cause the control circuitry to:
determine an entity name included in the query and an entity type that corresponds to the entity name by executing a named-entity recognition algorithm based on one or more terms of the query;
generate a query interpretation by replacing the entity name in the query with the corresponding entity type; and
determine that the query includes a specification of the content type based on the query interpretation and a classification model.

127. The non-transitory computer-readable medium of item 121, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.

128. The non-transitory computer-readable medium of item 121, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.

129. The non-transitory computer-readable medium of item 121, wherein the content types comprise at least one of audio content, video content, audio-video content, music content, movie content, television content, social media content, streaming content, a content category, or a content genre.

130. The non-transitory computer-readable medium of item 121, wherein the entity comprises at least one of an artist name or a content genre.

131. A system for responding to a natural language query, the method comprising:
means for receiving, via a user interface of a computing device, a query for an entity associated with a plurality of content types, the query including a specification of a content type from among the plurality of content types;
means for generating a response to the query comprising:
a list of identifiers of a plurality of the content items that are associated with the entity and have the specified content type, and
a list of one or more identifiers of one or more additional content types associated with the entity; and
means for providing the response to the query for visible or audible presentation via the computing device.

132. The system of item 131, further comprising:
means for receiving a selection of at least one of the identifiers of the one or more additional content types; and
means for, in response to receiving the selection, generating a list of identifiers of a plurality of the content items that are associated with the entity and have the content type corresponding to the selected identifier.

133. The system of item 131, wherein the one or more identifiers of one or more additional content types are listed in an order from a content type having a higher relative number of content items from among the content items that are associated with the entity and available from the content source to a content type having a lower relative number of content items from among the content items that are associated with the entity and available from the content source.

134. The system of item 131, further comprising:
means for determining, based on the content items that are associated with the entity and available from the content source, that the entity is associated with the plurality of content types.

135. The system of item 134, further comprising:
   means for determining, based on one or more terms of the query, that the query includes the specification of the content type.
136. The system of item 131, further comprising:
   means for determining an entity name included in the query and an entity type that corresponds to the entity name by executing a named-entity recognition algorithm based on one or more terms of the query;
   means for generating a query interpretation by replacing the entity name in the query with the corresponding entity type; and
   means for determining that the query includes a specification of the content type based on the query interpretation and a classification model.
137. The system of item 131, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
138. The system of item 131, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
139. The system of item 131, wherein the content types comprise at least one of audio content, video content, audio-video content, music content, movie content, television content, social media content, streaming content, a content category, or a content genre.
140. The system of item 131, wherein the entity comprises at least one of an artist name or a content genre.
141. A method for responding to a natural language query, the method comprising:
   receiving, via a user interface of a computing device, a query for an entity associated with a plurality of content types, the query including a specification of a content type from among the plurality of content types;
   generating a response to the query comprising:
      a list of identifiers of a plurality of the content items that are associated with the entity and have the specified content type, and
      a list of one or more identifiers of one or more additional content types associated with the entity; and
   providing the response to the query for visible or audible presentation via the computing device.
142. The method of item 141, further comprising receiving a selection of at least one of the identifiers of the one or more additional content types and, in response to receiving the selection, generating a list of identifiers of a plurality of the content items that are associated with the entity and have the content type corresponding to the selected identifier.
143. The method of item 141 or 142, wherein the one or more identifiers of one or more additional content types are listed in an order from a content type having a higher relative number of content items from among the content items that are associated with the entity and available from the content source to a content type having a lower relative number of content items from among the content items that are associated with the entity and available from the content source.
144. The method of any one of items 141 through 143, further comprising:
   determining, based on the content items that are associated with the entity and available from the content source, that the entity is associated with the plurality of content types.
145. The method of item 144, further comprising:
   determining, based on one or more terms of the query, that the query includes the specification of the content type.
146. The method of item any one of items 141 through 145, further comprising:
   determining an entity name included in the query and an entity type that corresponds to the entity name by executing a named-entity recognition algorithm based on one or more terms of the query;
   generating a query interpretation by replacing the entity name in the query with the corresponding entity type; and
   determining that the query includes a specification of the content type based on the query interpretation and a classification model.
147. The method of any one of items 141 through 146, wherein the response to the query further comprises an identifier of one or more amounts of content items of the one or more additional content types, respectively, and wherein the one or more amounts are based on respective amounts of content items of the one or more additional content types, respectively, that are associated with the entity and available from the content source.
148. The method of any one of items 141 through 147, wherein the response to the query further comprises an identifier of one or more percentages of content items of the one or more additional content types, respectively, and wherein the one or more percentages are based on relative percentages of content items of the one or more additional content types, respectively, that are associated with the entity and available from the content source.
149. The method of item any one of items 141 through 148, wherein the content types comprise at least one of audio content, video content, audio-video content, music content, movie content, television content, social media content, streaming content, a content category, or a content genre.
150. The method of any one of items 141 through 149, wherein the entity comprises at least one of an artist name or a content genre.

What is claimed is:

1. A method for responding to a natural language query, the method comprising:
   receiving, via a user interface of a computing device, a query for an entity associated with a plurality of content types, the plurality of content types comprising one or more of audio content, video content, audio-video content, music content, movie content, television content, social media content, or streaming content;
   determining whether the query specifies one or more content types of audio content, video content, audio-video content, music content, movie content, television content, social media content, or streaming content;
   in response to determining that the query specifies one or more content types of audio content, video content, audio-video content, music content, movie content, television content, social media content, or streaming content, generating, for visible or audible presentation via the computing device, a response to the query comprising results for each of the one or more specified content types; and in response to determining that the query is non-specific as to any content type of audio content, video content, audio-video content, music content, movie content, television content, social media content, or streaming content, generating, for visible or audible presentation via the computing device, a response to the query comprising results from each of the plurality of content types associated with the entity, wherein generating the response to the query comprising results from each of the plurality of content types associated with the entity comprises:
- identifying, from at least one content source, a plurality of content items associated with the entity;
- determining, from the plurality of content items, a total amount of content items associated with the entity;
- for each content type:
  - determining, from the plurality of content items associated with the entity, a respective amount of content items corresponding to the content type;
  - computing a respective proportion for the content type as a ratio of the respective amount of content items corresponding to the content type and the total amount of content items associated with the entity; and
  - determining, based on the respective proportion, a respective number of content items for display corresponding to the content type; and
- generating for presentation content item identifiers from the plurality of content items associated with the entity, wherein a number of displayed content item identifiers for each content type matches the determined respective number of content items for display corresponding to the content type.

2. The method of claim 1, further comprising:
determining an entity name included in the query and an entity type that corresponds to the entity name by executing a named-entity recognition algorithm based on one or more terms of the query; and
generating a query interpretation by replacing the entity name in the query with the corresponding entity type,
wherein determining whether the query specifies the one or more content types is performed based on the query interpretation and a classification model by identifying, using the classification model, at least one content type of the plurality of content types to which the query interpretation corresponds.

3. The method of claim 2, wherein determining whether the query specifies the one or more content types comprises matching the query interpretation to the at least one content type of the plurality of content types indicated by the classification model as corresponding to the query interpretation.

4. The method of claim 2, wherein the classification model maps query interpretations to corresponding content types irrespective of the entity name.

5. The method of claim 1, further comprising:
accessing data associated with at least one content source;
identifying, from the data associated with the at least one content source, content items that are associated with the entity and available from the at least one content source; and
wherein determining whether the query specifies one or more content types of audio content, video content, audio-video content, music content, movie content, television content, social media content, or streaming content comprises determining that the query is non-specific as to any content type of audio content, video content, audio-video content, music content, movie content, television content, social media content, or streaming content based on one or more terms of the query and the identified content items.

6. The method of claim 1, further comprising, in response to determining that the query specifies one or more content types of audio content, video content, audio-video content, music content, movie content, television content, social media content, or streaming content, excluding from the response to the query any results from content types other than the one or more specified content types.

7. The method of claim 1, wherein generating the response to the query comprising results from each of the plurality of content types associated with the entity comprises:
determining proportions of the plurality of content types associated with the entity and for which content items are available from at least one content source; and
generating, as the response to the query, representations of a plurality of the content items having content types associated with the entity in accordance with the determined proportions.

8. The method of claim 7, wherein the proportion for each content type is a proportion of the content items that are associated with the entity, are available from the at least one content source and have the respective content type, as a fraction of a total number of the content items that are associated with the entity and are available from the at least one content source.

9. A method for responding to a natural language query, the method comprising:
receiving, via a user interface of a computing device, a query for an entity;
determining whether the query specifies at least one content type;
accessing data associated with at least one content source;
in response to determining that the query specifies at least one content type, generating, for visible or audible presentation via the computing device, a response to the query comprising results for the one or more specified content types; and
in response to determining that the query is non-specific as to content type, generating, for visible or audible presentation via the computing device, a response to the query comprising results for available content types, wherein generating the response to the query comprising the results for the available content types comprises:
determining proportions of the content types associated with the entity and for which content items are available from the at least one content source; and
generating, as the response to the query, representations of a plurality of the content items having content types in accordance with the determined proportions;
wherein determining the proportions of the content types of content items that are associated with the entity and available from the at least one content source further comprises:
searching the at least one content source for the content items associated with the entity;

determining a total amount of the content items for each content type;

determining a total amount of the content items irrespective of content type; and for each content type, computing the proportion as a ratio of the total amount of the content items for the content type to a total amount of the content items irrespective of content type.

10. A system for responding to a natural language query, the system comprising:

a communication port configured to receive a query for an entity; and control circuitry configured to:

receive, via a user interface of a computing device using the communication port, a query for an entity associated with a plurality of content types, the plurality of content types comprising one or more of audio content, video content, audio-video content, music content, movie content, television content, social media content, or streaming content;

determine whether the query specifies one or more content types of audio content, video content, audio-video content, music content, movie content, television content, social media content, or streaming content;

in response to determining that the query specifies one or more content types of audio content, video content, audio-video content, music content, movie content, television content, social media content, or streaming content, generate, for visible or audible presentation via the computing device, a response to the query comprising results from each of the one or more specified content types; and in response to determining that the query lacks specification of any content type of audio content, video content, audio-video content, music content, movie content, television content, social media content, or streaming content, generate, for visible or audible presentation via the computing device, a response to the query comprising results from each of the plurality of content types associated with the entity, wherein the control circuitry is configured to generate the response to the query comprising results from each of the plurality of content types associated with the entity by:

identifying, from at least one content source, a plurality of content items associated with the entity;

determining, from the plurality of content items, a total amount of content items associated with the entity;

for each content type:

determining, from the plurality of content items associated with the entity, a respective amount of content items corresponding to the content type;

computing a respective proportion for the content type as a ratio of the respective amount of content items corresponding to the content type and the total amount of content items associated with the entity; and determining, based on the respective proportion, a respective number of content items for display corresponding to the content type; and generating for presentation content item identifiers from the plurality of content items associated with the entity, wherein a number of displayed content item identifiers for each content type matches the determined respective number of content items for display corresponding to the content type.

11. The system of claim 10, wherein the control circuitry is further configured to:

determine an entity name included in the query and an entity type that corresponds to the entity name by executing a named-entity recognition algorithm based on one or more terms of the query; and generate a query interpretation by replacing the entity name in the query with the corresponding entity type, wherein determining whether the query specifies the one or more content types is performed based on the query interpretation and a classification model by identifying, using the classification model, at least one content type of the plurality of content types to which the query interpretation corresponds.

12. The system of claim 11, wherein the control circuitry is further configured to determine whether the query specifies the one or more content types by matching the query interpretation to the at least one content type indicated by the classification model as corresponding to the query interpretation.

13. The system of claim 11, wherein the classification model maps query interpretations to corresponding content types irrespective of the entity name.

14. The system of claim 10, wherein the control circuitry is further configured to:

access data associated with at least one content source;

identify, from the data associated with the at least one content source, content items that are associated with the entity and available from the at least one content source; and wherein determining whether the query specifies one or more content types of audio content, video content, audio-video content, music content, movie content, television content, social media content, or streaming content comprises determining that the query lacks specification of any content type of audio content, video content, audio-video content, music content, movie content, television content, social media content, or streaming content based on one or more terms of the query and the identified content items.

15. The system of claim 10, wherein the control circuitry is further configured to, in response to determining that the query specifies one or more content types of audio content, video content, audio-video content, music content, movie content, television content, social media content, or streaming content, exclude from the response to the query any results from content types other than the one or more specified content types.

16. The system of claim 10, wherein the control circuitry is further configured to generate the response to the query comprising results from each of the plurality of content types associated with the entity by:

determining proportions of the plurality of content types associated with the entity and for which content items are available from at least one content source; and generating, as the response to the query, representations of a plurality of the content items having content types associated with the entity in accordance with the determined proportions.

17. The system of claim 16, wherein the proportion for each content type is a percentage of a number of the content items that are associated with the entity, are available from the at least one content source, and have the respective content type, as a fraction of a total number of the content items that are associated with the entity and are available from the at least one content source.

18. The system of claim 16, wherein the control circuitry is further configured to determine the proportions of the content types of the content items that are associated with the entity and available from the at least one content source by:
   searching the at least one content source for the content items associated with the entity;
   determining a total amount of the content items for each content type;
   determining a total amount of the content items irrespective of content type; and
   for each content type, computing the proportion as a ratio of the total amount of the content items for the content type to a total amount of the content items irrespective of content type.

* * * * *